(12) United States Patent
Golitschek Edler Von Elbwart et al.

(10) Patent No.: US 11,368,967 B2
(45) Date of Patent: *Jun. 21, 2022

(54) SELF- AND CROSS- CARRIER SCHEDULING

(71) Applicant: Panasonic Intellectual Property Corporation of America, Torrance, CA (US)

(72) Inventors: Alexander Golitschek Edler Von Elbwart, Darmstadt (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/721,261

(22) Filed: Dec. 19, 2019

(65) Prior Publication Data
US 2020/0128565 A1     Apr. 23, 2020

Related U.S. Application Data

(63) Continuation of application No. 15/573,803, filed as application No. PCT/JP2019/003141 on Jun. 30, 2016, now Pat. No. 10,555,329.

(30) Foreign Application Priority Data
Aug. 7, 2015  (EP) .................................. 15180290

(51) Int. Cl.
*H04W 72/12* (2009.01)
*H04L 5/00* (2006.01)
*H04W 74/08* (2009.01)

(52) U.S. Cl.
CPC ......... *H04W 72/1215* (2013.01); *H04L 5/001* (2013.01); *H04W 74/0808* (2013.01)

(58) Field of Classification Search
None
See application file for complete search history.

(56) References Cited

U.S. PATENT DOCUMENTS

2013/0003711 A1* 1/2013 Konno ............... H04L 27/2634
                                                                       370/343
2013/0016672 A1   1/2013 Yang et al.
(Continued)

OTHER PUBLICATIONS

3GPP TS 36.211, V12.5.0, "3rd Generation Partnership Project; Technical Specification Group Radio Access Network; Evolved Universal Terrestrial Radio Access (E-UTRA); Physical channels and modulation", Mar. 2015.
(Continued)

*Primary Examiner* — Scott M Sciacca
(74) *Attorney, Agent, or Firm* — Seed IP Law Group LLP

(57) ABSTRACT

The present disclosure relates to transmission and reception of data in a wireless communication system, the wireless communication system supporting aggregation of a plurality of component carriers and an additional carrier accessible by a listen before talk approach. In particular, monitoring is performed of a search space on a cross-scheduling component carrier for detecting downlink control information having a carrier identification field indicating the cross-scheduling component carrier as well as for detecting downlink control information with the carrier identification field indicating the additional carrier, wherein the search space is specified by a subset of resources, associated with carrier identification of the cross-scheduling component carrier but is not associated with carrier identification of the additional carrier. Then data are transmitted or received on the carriers in accordance with the received downlink control information.

14 Claims, 18 Drawing Sheets

(56) References Cited

U.S. PATENT DOCUMENTS

| | | | |
|---|---|---|---|
| 2014/0105150 A1* | 4/2014 | Kim | H04L 5/001 |
| | | | 370/329 |
| 2014/0119339 A1 | 5/2014 | Yang et al. | |
| 2015/0124724 A1 | 5/2015 | Yang et al. | |
| 2016/0323854 A1* | 11/2016 | Gao | H04L 1/1822 |
| 2016/0338023 A1 | 11/2016 | Nogami et al. | |
| 2017/0034808 A1 | 2/2017 | Ouchi et al. | |
| 2018/0199369 A1* | 7/2018 | Larsson | H04W 74/006 |
| 2018/0213437 A1* | 7/2018 | Li | H04L 29/08 |
| 2018/0338319 A1 | 11/2018 | Kim et al. | |

OTHER PUBLICATIONS

3GPP TS 36.212, V12.4.0, "3rd Generation Partnership Project; Technical Specification Group Radio Access Network; Evolved Universal Terrestrial Radio Access (E-UTRA); Multiplexing and channel coding", Mar. 2015.

3GPP 36.213, V12.5.0, "3rd Generation Partnership Project; Technical Specification Group Radio Access Network; Evolved Universal Terrestrial Radio Access (E-UTRA); Physical layer procedures", Mar. 2015.

3GPP TSG RAN WG1 #78bis, R1-144348, "Regulatory Requirements for Unlicensed Spectrum", Oct. 6, 2014.

3GPP TSG RAN WG1 Meeting #81, R1-153135, "On Scheduling in LAA with Downlink and Uplink Transmissions", May 2015.

3GPP TSG RAN WG1 Meeting #81, R1-153144, "On Scheduling and HARQ operation for LAA", May 2015.

3GPP TSG RAN WG1 Meeting #81, R1-153013, "Control signalling and HARQ related issues for Licensed-assisted access using LTE", May 2015.

ETSI EN 301 893, V1.8.0, "Broadband Radio Access Networks (BRAN); 5GHz high performance RLAN; Harmonized EN covering the essential requirements of article 3.2 of the R&TTE Directive", Jan. 2015.

International Search Report of PCT application No. PCT/JP2016/003141 dated Aug. 9, 2016.

"LTE—The UMTS Long Term Evolution—From Theory to Practice", Edited by Stefanie Sesia, Issam Toufik, Matthew Baker, Chapter 9.3, Jul. 2011.

* cited by examiner

| Cell A | DL Self-Scheduling: DCI Size A1 | DL Self-Scheduling: DCI Size A2 |
|---|---|---|
| | UL Self-Scheduling: DCI Size A1 | UL Self-Scheduling: DCI Size A3 |
| | UL Cross-Scheduling: DCI Size U1 | DL Cross-Scheduling: DCI Size D1 |
| | UL Cross-Scheduling: DCI Size U2 | DL Cross-Scheduling: DCI Size D2 |
| Cell B | DL Self-Scheduling: DCI Size B1 | DL Self-Scheduling: DCI Size B2 |
| | UL Self-Scheduling: DCI Size B1 | UL Self-Scheduling: DCI Size B3 |

*Fig. 13*

| Cell A | DL Self-Scheduling: DCI Size A1 | DL Self-Scheduling: DCI Size A2 |
|---|---|---|
| | UL Self-Scheduling: DCI Size A1 | UL Self-Scheduling: DCI Size A3 |
| | UL Cross-Scheduling: DCI Size U1 | DL Cross-Scheduling: DCI Size D1 |
| | UL Cross-Scheduling: DCI Size U2 | DL Cross-Scheduling: DCI Size D2 |
| Cell B | DL Self-Scheduling: DCI Size B1 | DL Self-Scheduling: DCI Size B2 |
| | UL Self-Scheduling: DCI Size B1 | UL Self-Scheduling: DCI Size B3 |

SELF- AND CROSS- CARRIER SCHEDULING

BACKGROUND

Technical Field

The present disclosure relates to scheduling in a band shared by two different radio access technology systems.

Description of the Related Art

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N^{DL}_{RB} * N^{RB}_{SC}$ subcarriers and $N^{DL}_{symb}$ OFDM symbols. $N^{DL}_{RB}$ is the number of resource blocks within the bandwidth. The quantity $N^{DL}_{RB}$ depends on the downlink transmission bandwidth configured in the cell and shall fulfill $$N_{RB}^{min,DL} \leq N_{RB}^{DL} \leq N_{RB}^{max,DL},$$

where $N^{min,DL}_{RB}=6$ and $N^{max,DL}_{RB}=110$ are respectively the smallest and the largest downlink bandwidths, supported by the current version of the specification. $N^{RB}_{SC}$ is the number of subcarriers within one resource block. For normal cyclic prefix subframe structure, $N^{RB}_{SC}=12$ and $N^{DL}_{symb}=7$.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)" (NPL 1), section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n*300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

The characteristics of the downlink and uplink PCell are:
For each SCell the usage of uplink resources by the UE in addition to the downlink ones is configurable (the number of DL SCCs configured is therefore always larger or equal to the number of UL SCCs, and no SCell can be configured for usage of uplink resources only)
The downlink PCell cannot be de-activated, unlike SCells
Re-establishment is triggered when the downlink PCell experiences Rayleigh fading (RLF), not when downlink SCells experience RLF
Non-access stratum information is taken from the downlink PCell
PCell can only be changed with handover procedure (i.e., with security key change and RACH procedure)
PCell is used for transmission of PUCCH
The uplink PCell is used for transmission of Layer 1 uplink control information
From a UE viewpoint, each uplink resource only belongs to one serving cell The configuration and reconfiguration, as well as addition and removal, of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover). Each SCell is configured with a serving cell index, when the SCell is added to one UE; PCell has always the serving cell index 0.

When a user equipment is configured with carrier aggregation there is at least one pair of uplink and downlink component carriers that is always active. The downlink component carrier of that pair might be also referred to as 'DL anchor carrier'. Same applies also for the uplink.

When carrier aggregation is configured, a user equipment may be scheduled on multiple component carriers simultaneously, but at most one random access procedure shall be ongoing at any time. Cross-carrier scheduling allows the PDCCH of a component carrier to schedule resources on another component carrier. For this purpose a component carrier identification field is introduced in the respective DCI (Downlink Control Information) formats, called CIF.

A linking, established by RRC signaling, between uplink and downlink component carriers allows identifying the uplink component carrier for which the grant applies when there is no cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

Layer 1/Layer 2 Control Signaling

In order to inform the scheduled users about their allocation status, transport format and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH).

A PDCCH carries a message as a Downlink Control Information (DCI), which in most cases includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH. Furthermore, Release 11 introduced an EPDCCH that fulfils basically the same function as the PDCCH, i.e., conveys L1/L2 control signaling, even though the detailed transmission methods are different from the PDCCH. Further details can be found particularly in the current versions of 3GPP TS 36.211 and 36.213 (NPL 2), incorporated herein by reference. Consequently, most items outlined in the background and the embodiments apply to PDCCH as well as EPDCCH, or other means of conveying L1/L2 control signals, unless specifically noted.

Generally, the information sent in the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;
Resource allocation information, indicating the resources (e.g., Resource Blocks, RBs) on which a user is allocated. Alternatively this information is termed resource block assignment (RBA). Note, that the number of RBs on which a user is allocated can be dynamic;
Carrier indicator, which is used if a control channel transmitted on a first carrier assigns resources that concern a second carrier, i.e., resources on a second carrier or resources related to a second carrier; (cross carrier scheduling);
Modulation and coding scheme that determines the employed modulation scheme and coding rate;
HARQ information, such as a new data indicator (NDI) and/or a redundancy version (RV) that is particularly useful in retransmissions of data packets or parts thereof;
Power control commands to adjust the transmit power of the assigned uplink data or control information transmission;
Reference signal information such as the applied cyclic shift and/or orthogonal cover code index, which are to be employed for transmission or reception of reference signals related to the assignment;
Uplink or downlink assignment index that is used to identify an order of assignments, which is particularly useful in TDD systems;
Hopping information, e.g., an indication whether and how to apply resource hopping in order to increase the frequency diversity;
CSI request, which is used to trigger the transmission of channel state information in an assigned resource; and
Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in their fields as mentioned above. The different DCI formats that are currently defined for LTE are as follows and described in detail in 3GPP TS 36.212, "Multiplexing and channel coding" (NPL 3), section 5.3.3.1 (current version v12.4.0 available at http://www.3gpp.org and incorporated herein by reference). In addition, for further information regarding the DCI formats and the particular information that is transmitted in the DCI, please refer to the mentioned technical standard or to LTE—The UMTS Long Term Evolution—From Theory to Practice, Edited by Stefanie Sesia, Issam Toufik, Matthew Baker, Chapter 9.3 (NPL 4), incorporated herein by reference.

Format 0: DCI Format 0 is used for the transmission of resource grants for the PUSCH, using single-antenna port transmissions in uplink transmission mode 1 or 2.

Format 1: DCI Format 1 is used for the transmission of resource assignments for single codeword PDSCH transmissions (downlink transmission modes 1, 2 and 7).

Format 1A: DCI Format 1A is used for compact signaling of resource assignments for single codeword PDSCH transmissions, and for allocating a dedicated preamble signature to a mobile terminal for contention-free random access (for all transmissions modes).

Format 1B: DCI Format 1B is used for compact signaling of resource assignments for PDSCH transmissions using closed loop precoding with rank-1 transmission (downlink transmission mode 6). The information transmitted is the same as in Format 1A, but with the addition of an indicator of the precoding vector applied for the PDSCH transmission.

Format 1C: DCI Format 1C is used for very compact transmission of PDSCH assignments. When format 1C is used, the PDSCH transmission is constrained to using QPSK modulation. This is used, for example, for signaling paging messages and broadcast system information messages.

Format 1D: DCI Format 1D is used for compact signaling of resource assignments for PDSCH transmission using multi-user MIMO. The information transmitted is the same as in Format 1B, but instead of one of the bits of the precoding vector indicators, there is a single bit to indicate whether a power offset is applied to the data symbols. This feature is needed to show whether or not the transmission power is shared between two UEs. Future versions of LTE may extend this to the case of power sharing between larger numbers of UEs.

Format 2: DCI Format 2 is used for the transmission of resource assignments for PDSCH for closed-loop MIMO operation (transmission mode 4).

Format 2A: DCI Format 2A is used for the transmission of resource assignments for PDSCH for open-loop MIMO operation. The information transmitted is the same as for Format 2, except that if the eNodeB has two transmit antenna ports, there is no precoding information, and for four antenna ports two bits are used to indicate the transmission rank (transmission mode 3).

Format 2B: Introduced in Release 9 and is used for the transmission of resource assignments for PDSCH for dual-layer beamforming (transmission mode 8).

Format 2C: Introduced in Release 10 and is used for the transmission of resource assignments for PDSCH for closed-loop single-user or multi-user MIMO operation with up to 8 layers (transmission mode 9).

Format 2D: introduced in Release 11 and used for up to 8 layer transmissions; mainly used for COMP (Cooperative Multipoint) (transmission mode 10)

Format 3 and 3A: DCI formats 3 and 3A are used for the transmission of power control commands for PUCCH and PUSCH with 2-bit or 1-bit power adjustments respectively. These DCI formats contain individual power control commands for a group of UEs.

Format 4: DCI format 4 is used for the scheduling of the PUSCH, using closed-loop spatial multiplexing transmissions in uplink transmission mode 2.

The PDCCH carries DCI on an aggregation of one or a plurality of consecutive control channel elements (CCEs). A control channel element corresponds to 9 resource element groups (REG) of which each consists of four or six resource elements.

A search space indicates a set of CCE locations where the UE may find its PDCCHs. Each PDCCH carries one DCI and is identified by the RNTI (radio network temporary identity) implicitly encoded in the CRC attachment of the DCI. The UE monitors the CCEs of a configured search space(s) by blind decoding and checking the CRC.

Blind decoding means that the terminal has no or limited further information concerning the location of the information directed to it and carried in the search space. It has a limited knowledge about the employed number of aggregated CCEs either. Accordingly, the terminal has to try decoding the PDCCH by a trial-and-error method for several allowed or defined parameters, such as for different numbers of aggregated CCEs and for different resources within the search space. These decoding attempts are called blind decoding. The success of these decoding attempts is checked by checking CRC which is (for user-specific search space) scrambled with a temporary identity (RNTI) of the terminal to which the information is directed. Accordingly, assuming error-free transmissions, the CRC check will be only successful if the information is directed to the checking terminal.

A search space may be a common search space and a UE-specific search space. A UE is required to monitor both common and UE-specific search spaces, which may be overlapping. The common search space carries the DCIs that are common for all UEs such as system information (using the SI-RNTI), paging (P-RNTI), PRACH responses (RA-RNTI), or UL TPC commands (TPC-PUCCH/PUSCH-RNTI). The UE-specific search space can carry DCIs for UE-specific allocations using the UE's assigned C-RNTI, semi-persistent scheduling (SPS C-RNTI), or initial allocation (temporary C-RNTI).

An example of different DCIs with exemplary field sizes is provided in the following tables, where especially the sizes depend on configurable option; therefore a size of "0" should be understood such that in certain configuration options the size is zero, however for other options it can be larger.

TABLE 1

DCI Format 0 fields/definitions

| Field Name | Field Size | Remarks |
|---|---|---|
| Carrier indicator | 3 | Present only if configured |
| Flag for format0/format1A differentiation | 1 | Value "0" for Format 0 |
| Hopping flag/RA Type 1 MSB | 1 | |
| Resource block assignment and hopping resource allocation | 13 | |
| Modulation and coding scheme and redundancy version | 5 | |
| New data indicator | 1 | |
| TPC command for scheduled PUSCH | 2 | |
| Cyclic shift for DM RS and OCC index | 3 | |
| UL index or Downlink Assignment Index (DAI) | 2 | Present only for TDD; UL index for configuration 0, DAI for configuration 1-6 |
| CSI request | 2 | 2 bits if CA is configured and transmitted in UE-specific by C-RNTI; 1 bit otherwise |
| SRS request | 0 | Present only if configured and if transmitted in UE-specific by C-RNTI |
| Resource allocation type | 1 | Present only if DL bandwidth >= UL bandwidth |

TABLE 2

DCI Format 1A fields/definitions

| Field Name | Field Size | Remarks |
|---|---|---|
| Carrier indicator | 3 | Present only if configured |
| Flag for format0/format1A differentiation | 1 | Value "1" for Format 1A |
| Localized/Distributed VRB assignment flag | 1 | Value "0" for Localized, "1" for Distributed |
| Resource block assignment | 13 | |
| Modulation and coding scheme | 5 | |
| HARQ process number | 4 | |
| New data indicator | 1 | |
| Redundancy version | 2 | |
| TPC command for PUCCH | 2 | |
| Downlink Assignment Index | 2 | Present only for TDD; valid only for configuration 1-6 |
| SRS request | 0 | Present only if configured and if transmitted in UE-specific by C-RNTI |
| HARQ-ACK resource offset | 0 | Present only if this format is carried by EPDCCH |

TABLE 3

DCI Format 2D fields/definitions

| Field Name | Field Size | Remarks |
|---|---|---|
| Carrier indicator | 3 | Present only if configured |
| Resource allocation header | 1 | Exists only for >10 RB |
| Resource block assignment | 25 | Depends on RBG size |
| TPC command for PUCCH | 2 | |
| Downlink Assignment Index | 2 | Present only for TDD; valid only for configuration 1-6 |
| HARQ process number | 4 | |
| Antenna port(s), scrambling identity and number of layers | 3 | |
| SRS request | 0 | Present only if configured and for TDD |
| TB1 Modulation and coding scheme | 5 | |
| TB1 New data indicator | 1 | |
| TB1 Redundancy version | 2 | |
| TB2 Modulation and coding scheme | 5 | |
| TB2 New data indicator | 1 | |
| TB2 Redundancy version | 2 | |
| PDSCH RE Mapping and Quasi-Co-Location Indicator | 2 | also known as "PQI" |
| HARQ-ACK resource offset | 0 | Present only if this format is carried by EPDCCH |

TABLE 4

DCI Format 4 fields/definitions

| Field Name | Field Size | Remarks |
|---|---|---|
| Carrier indicator | 3 | Present only if configured |
| Resource block assignment | 14 | Maximum of bits required to indicate single-cluster and multi-cluster |
| TPC command for scheduled PUSCH | 2 | |
| Cyclic shift for DM RS and OCC index | 3 | |
| UL index or Downlink Assignment Index (DAI) | 2 | Present only for TDD; UL index for configuration 0, DAI for configuration 1-6 |
| CSI request | 1 | 2 bits if CA is configured; 1 bit otherwise |
| SRS request | 2 | |
| Resource allocation type | 1 | |
| TB1 Modulation and coding scheme | 5 | |
| TB1 New data indicator | 1 | |
| TB2 Modulation and coding scheme | 5 | |
| TB2 New data indicator | 1 | |
| Precoding information and number of layers | 3 | |

As can be seen from these tables, the DCI formats differ from each other by their length (sum of the column "Field Size", which is in units of bits. This is caused by the different purpose of the DCI formats and thus, different fields included therein.

LTE on Unlicensed Bands—Licensed-Assisted Access LAA

In September 2014, 3GPP initiated a new study item on LTE operation on unlicensed spectrum. The reason for extending LTE to unlicensed bands is the ever-growing demand for wireless broadband data in conjunction with the limited amount of licensed bands. The unlicensed spectrum therefore is more and more considered by cellular operators as a complementary tool to augment their service offering. The advantage of LTE in unlicensed bands compared to relying on other radio access technologies (RAT) such as Wi-Fi is that complementing the LTE platform with unlicensed spectrum access enables operators and vendors to leverage the existing or planned investments in LTE/EPC hardware in the radio and core network.

However, it has to be taken into account that unlicensed spectrum access can never match the qualities of licensed spectrum access due to the inevitable coexistence with other radio access technologies (RATs) in the unlicensed spectrum. LTE operation on unlicensed bands will therefore at least in the beginning be considered a complement to LTE on licensed spectrum rather than as stand-alone operation on unlicensed spectrum. Based on this assumption, 3GPP established the term Licensed Assisted Access (LAA) for the LTE operation on unlicensed bands in conjunction with at least one licensed band. Future stand-alone operation of LTE on unlicensed spectrum without relying on LAA however shall not be excluded.

The currently-intended general LAA approach at 3GPP is to make use of the already specified Rel-12 carrier aggregation (CA) framework as much as possible, where the CA framework configuration as explained before comprises a so-called primary cell (PCell) carrier and one or more secondary cell (SCell) carriers. CA supports in general both self-scheduling of cells (scheduling information and user data are transmitted on the same component carrier) and cross-carrier scheduling between cells (scheduling information in terms of PDCCH/EPDCCH and user data in terms of PDSCH/PUSCH are transmitted on different component carriers). This includes that a common DRX scheme is used for LAA, particularly if it does not result in a need for very short DRX cycles/very long Active Times. As with carrier aggregation mentioned above, "common DRX" scheme in this respect means that the UE operates the same DRX for all aggregated and activated cells, including unlicensed and licensed cells. Consequently, the Active Time is the same for all serving cells, e.g., UE is monitoring PDCCH of all downlink serving cells in the same subframe; the DRX-related timers and parameters are configured per UE.

A very basic scenario is illustrated in FIG. 3, with a licensed PCell, licensed SCell 1, and various unlicensed SCells 2, 3, and 4 (exemplarily depicted as small cells). The transmission/reception network nodes of unlicensed SCells 2, 3, and 4 could be remote radio heads managed by the eNB or could be nodes that are attached to the network but not managed by the eNB. For simplicity, the connection of these nodes to the eNB or to the network is not explicitly shown in the figure.

At present, the basic approach envisioned at 3GPP is that the PCell will be operated on a licensed band while one or more SCells will be operated on unlicensed bands. The benefit of this strategy is that the PCell can be used for reliable transmission of control messages and user data with high quality of service (QoS) demands, such as for example voice and video, while an SCell on unlicensed spectrum might yield, depending on the scenario, to some extent significant QoS reduction due to inevitable coexistence with other RATs.

It has been agreed during RAN1 #78bis that the LAA investigation at 3GPP will focus on unlicensed bands at 5 GHz. One of the most critical issues is therefore the coexistence with Wi-Fi (IEEE 802.11) systems operating at these unlicensed bands. In order to support fair coexistence between LTE and other technologies such as Wi-Fi as well to guarantee fairness between different LTE operators in the same unlicensed band, the channel access of LTE for unlicensed bands has to abide by certain sets of regulatory rules which depend on region and particular frequency band; a comprehensive description of the regulatory requirements for all regions for operation on unlicensed bands at 5 GHz is given in R1-144348, "Regulatory Requirements for Unlicensed Spectrum", Alcatel-Lucent et al., RAN1 #78bis, September 2014 (NPL 5) incorporated herein by reference. Depending on region and band, regulatory requirements that have to be taken into account when designing LAA procedures comprise Dynamic Frequency Selection (DFS), Transmit Power Control (TPC), Listen Before Talk (LBT) and discontinuous transmission with limited maximum transmission duration. The intention of 3GPP is to target a single global framework for LAA which basically means that all requirements for different regions and bands at 5 GHz have to be taken into account for the system design.

The listen-before-talk (LBT) procedure is defined as a mechanism by which an equipment applies a clear channel assessment (CCA) check before using the channel. The CCA utilizes at least energy detection to determine the presence or absence of other signals on a channel in order to determine if a channel is occupied or clear, respectively. European and Japanese regulations mandate the usage of LBT in the unlicensed bands. Apart from regulatory requirements, carrier sensing via LBT is one way for fair sharing of the unlicensed spectrum and hence it is considered to be a vital feature for fair and friendly operation in the unlicensed spectrum in a single global solution framework.

In unlicensed spectrum, channel availability cannot always be guaranteed. In addition, certain regions such as Europe and Japan prohibit continuous transmission and impose limits on the maximum duration of a transmission burst in the unlicensed spectrum. Hence, discontinuous transmission with limited maximum transmission duration is a required functionality for LAA DFS is required for certain regions and bands in order to detect interference from radar systems and to avoid co-channel operation with these systems. The intention is furthermore to achieve a near-uniform loading of the spectrum. The DFS operation and corresponding requirements are associated with a master-slave principle. The master shall detect radar interference, can however rely on another device, associated with the master, to implement radar detection.

The operation on unlicensed bands at 5-GHz is in most regions limited to rather low transmit power levels compared to the operation on licensed bands which results in small coverage areas. Even if the licensed and unlicensed carriers were to be transmitted with identical power, usually the unlicensed carrier in the 5 GHz band would be expected to support a smaller coverage area than a licensed cell in the 2 GHz band due to increased path loss and shadowing effects for the signal. A further requirement for certain regions and bands is the use of TPC in order to reduce the average level of interference caused for other devices operating on the same unlicensed band.

Detailed information can be found in the harmonized European standard ETSI EN 301 893, current version 1.8.0 (NPL 6), incorporated herein by reference.

Following this European regulation regarding LBT, devices have to perform a Clear Channel Assessment (CCA) before occupying the radio channel with a data transmission. It is only allowed to initiate a transmission on the unlicensed channel after detecting the channel as free based, e.g., on energy detection. In particular, the equipment has to observe the channel for a certain minimum time (e.g., for Europe 20 µs, see ETSI 301 893, under clause 4.8.3) during the CCA. The channel is considered occupied if the detected energy level exceeds a configured CCA threshold (e.g., for Europe, −73 dBm/MHz, see ETSI 301 893, under clause 4.8.3), and conversely is considered to be free if the detected power level is below the configured CCA threshold. If the channel is determined as being occupied, it shall not transmit on that channel during the next Fixed Frame Period. If the channel is classified as free, the equipment is allowed to transmit immediately. The maximum transmit duration is restricted in order to facilitate fair resource sharing with other devices operating on the same band.

The energy detection for the CCA is performed over the whole channel bandwidth (e.g., 20 MHz in unlicensed bands at 5 GHz), which means that the reception power levels of all subcarriers of an LTE OFDM symbol within that channel contribute to the evaluated energy level at the device that performed the CCA.

Furthermore, the total time during which an equipment has transmissions on a given carrier without re-evaluating the availability of that carrier (i.e., LBT/CCA) is defined as the Channel Occupancy Time (see ETSI 301 893, under clause 4.8.3.1). The Channel Occupancy Time shall be in the range of 1 ms to 10 ms, where the maximum Channel Occupancy Time could be, e.g., 4 ms as currently defined for Europe. Furthermore, there is a minimum Idle time the UE is not allowed to transmit after a transmission on the unlicensed cell, the minimum Idle time being at least 5% of the Channel Occupancy Time. Towards the end of the Idle Period, the UE can perform a new CCA, and so on. This transmission behavior is schematically illustrated in FIG. 4, the figure being taken from ETSI EN 301 893 (there FIG. 2: "Example of timing for Frame Based Equipment").

Considering the different regulatory requirements, it is apparent that the LTE specification for operation in unlicensed bands will require several changes compared to the current Rel-12 specification that is limited to licensed band operation.

CITATION LIST

Non Patent Literature

NPL 1
3GPP TS 36.211, "Evolved Universal Terrestrial Radio Access (E-UTRA); Physical Channels and Modulation, version 12.5.0
NPL 2
3GPP 36.213, "Multiplexing and channel coding", version 12.5.0
NPL 3
3GPP 36.212, "Multiplexing and channel coding", version 12.4.0
NPL 4
LTE—The UMTS Long Term Evolution—From Theory to Practice, Edited by Stefanie Sesia, Issam Toufik, Matthew Baker, Chapter 9.3
NPL 5
R1-144348, "Regulatory Requirements for Unlicensed Spectrum", Alcatel-Lucent et al., RAN1 #78bis, September 2014
NPL 6
ETSI EN 301 893, version 1.8.0

BRIEF SUMMARY

One non-limiting and exemplary embodiment provides an improved method for scheduling in a band shared by two different radio access technology systems. The independent claims provide non-limiting and exemplary embodiments. Advantageous embodiments are subject to the dependent claims.

According to an embodiment, a method is provided for transmitting or receiving data in subframes of a wireless communication system, the wireless communication system supporting aggregation of a plurality of component carriers and an additional carrier accessible by a listen before talk approach, including the steps of: monitoring a search space on a cross-scheduling component carrier for detecting downlink control information having a carrier identification field indicating the cross-scheduling component carrier as well as for detecting downlink control information with the carrier identification field indicating the additional carrier, wherein the search space is specified by a subset of resources, associated with carrier identification of the cross-scheduling component carrier but is not associated with carrier identification of the additional carrier, and transmitting or receiving data on the carriers in accordance with the received downlink control information.

According to another embodiment, a method for transmitting or receiving data in subframes of a wireless communication system, the wireless communication system supporting aggregation of a plurality of component carriers and an additional carrier accessible by a listen before talk approach, including the steps of: transmitting in a search space on a cross-scheduling component carrier downlink control information having a carrier identification field indicating the cross-scheduling component carrier as well as downlink control information with the carrier identification field indicating the additional carrier, wherein the search space is specified by a subset of resources, associated with carrier identification of the cross-scheduling component carrier but is not associated with carrier identification of the additional carrier, and receiving or transmitting data on the carriers in accordance with the transmitted downlink control information.

According to another embodiment, an apparatus for transmitting or receiving data in subframes of a wireless communication system, the wireless communication system supporting aggregation of a plurality of component carriers and an additional carrier accessible by a listen before talk approach, including: search space monitoring unit for monitoring a search space on a cross-scheduling component carrier for detecting downlink control information having a carrier identification field indicating the cross-scheduling component carrier as well as for detecting downlink control information with the carrier identification field indicating the additional carrier, wherein the search space is specified by a subset of resources, associated with carrier identification of the cross-scheduling component carrier but is not associated with carrier identification of the additional carrier, and transceiver unit for transmitting or receiving data on the carriers in accordance with the received downlink control information.

According to a further embodiment, an apparatus for transmitting or receiving data in subframes of a wireless communication system, the wireless communication system supporting aggregation of a plurality of component carriers and an additional carrier accessible by a listen before talk approach, including: transceiver unit for transmitting in a search space on a cross-scheduling component carrier downlink control information having a carrier identification field indicating the cross-scheduling component carrier as well as downlink control information with the carrier identification field indicating the additional carrier, wherein the search space is specified by a subset of resources, associated with carrier identification of the cross-scheduling component carrier but is not associated with carrier identification of the additional carrier, and for receiving or transmitting data on the carriers in accordance with the transmitted downlink control information.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs. Moreover, the apparatuses may be embodied in an integrated circuit.

BRIEF DESCRIPTION OF THE SEVERAL VIEWS OF THE DRAWINGS

In the following exemplary embodiments are described in more detail with reference to the attached figures and drawings.

FIG. 13 is a schematic drawing illustrating sizes of DCI for different employment scenarios.

FIG. 15 is a schematic drawing illustrating sizes of DCI for different employment scenarios.

DETAILED DESCRIPTION

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The term "unlicensed cell" or alternatively "unlicensed carrier" as used in the set of claims and in the application is to be understood broadly as a cell/carrier in an unlicensed frequency band—alternative terminology includes license-exempt band, unlicensed spectrum, contention-based radio access, etc. Correspondingly, the term "licensed cell" or alternatively "licensed carrier" as used in the set of claims and in the application is to be understood broadly as a cell/carrier in a licensed frequency band. Exemplarily, these terms are to be understood in the context of 3GPP as of Release 12/13 and the Licensed-Assisted Access Work Item.

As described in the above background section, DCI is signaling, which in presence of more configured carriers may be transmitted on the carrier to which the signaling relates (referred to in the following as "self-signaling" or "self-indicating") or may be transmitted in another carrier (referred to in the following as "self-signaling" or "self-indicating"). In the following, also the typically used terms "self-scheduling" and "cross-scheduling" are employed. This term is used synonymously with the terms "self-signaling" or "self-indicating" and "self-signaling" or "self-indicating". Thus, for instance, on a cross-scheduling carrier, any signaling (control information) regarding other carriers may be transmitted, i.e., it is not limited to the scheduling control information. Likewise a self-scheduling carrier is not limited to transmitting scheduling control information regarding the same carrier. Examples of such non-scheduling control information include communication configuration information such as power control information or TDD UL/DL configuration information.

Figure 5:
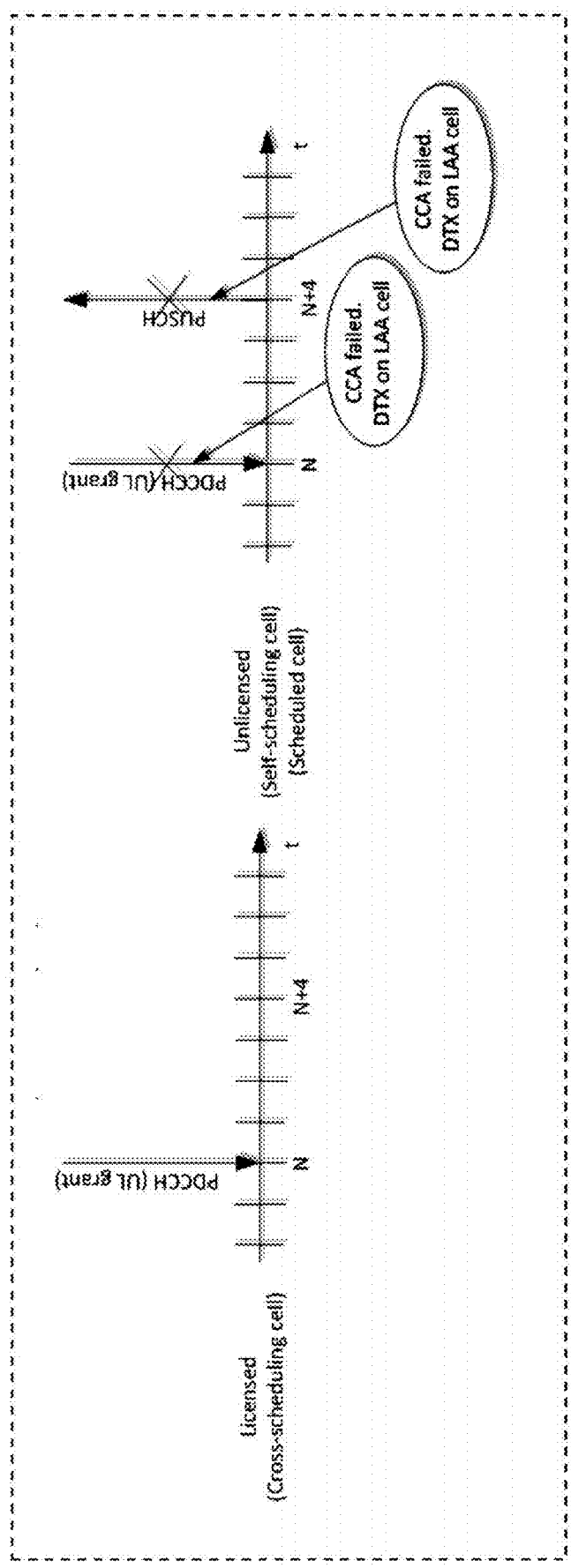
FIG. 5 is a schematic drawing illustrating transmission of an uplink grant on a licensed and unlicensed band.

FIG. 5 illustrates a problem underlying the present disclosure. As described above, the unlicensed band (band accessible by LBT) is incorporated into a multiple component carrier system as an additional component carrier (or cell). When adding such LBT carrier (which can also be denoted as a "CCA carrier"), the policies for signaling, including scheduling may be designed in various different manners. If the LBT carrier has configured self-indication/self-scheduling, the terminal has to monitor (i.e., blindly decode) a predetermined search space on the LBT carrier to receive control information relating to the LBT carrier. This control information may be, for instance, scheduling information. However, alternatively, or in addition, the control information may be power control information or other kinds of configurations of the LBT transmission. In FIG. 5, an example is shown, in which the control information carried on PDCCH includes an uplink grant. This downlink control information (DCI) may fail to be received. This may be caused by the fact that the base station performing CCA fails to transmit the PDCCH since the CCA procedure reveals that the resources are used by other transmissions such as transmissions over WLAN. However, despite being transmitted by the base station it may be also caused by missing the PDCCH for instance due to bad channel conditions. If the DCI was received correctly, the corresponding PUSCH would be transmitted a defined period, e.g., four subframes, later, based on the reception of the uplink grant. However, in order to transmit the PUSCH, the UE has to perform CCA, i.e., check whether there is transmission pending on the relevant resources. In the example of FIG. 5, there is another transmission (such as WLAN) pending and thus, PUSCH cannot be transmitted in the granted resources.

The left hand side of FIG. 5 illustrates cross-indicating/cross-scheduling on the licensed carrier, i.e., carrier on which no LBT has to be performed before transmitting on the granted resources. Such carrier may be a component carrier of the LTE, the resources of which are not shared with any other system. On the cross-scheduling carrier, uplink grants may be received for transmission in other carriers, possibly including the LBT carrier or a plurality of the LBT carriers. Since there is no LBT necessary before the base station transmits the PDCCH, the probability of losing the PDCCH by the UE is lower. In this example, the PDCCH including an uplink grant for an LBT carrier. After reception of the grant, the UE has to perform carrier sensing of the LBT carrier before transmitting on the granted resources (same as when the grant is received over the LBT carrier in the self-scheduling example above.

In order to make the DCI transmission faster and more robust, the opportunistic transmission as performed in case of self-scheduling may be advantageously avoided by employing cross-scheduling on a non-LBT carrier. The same may be true for self-indicating vs. cross indicating of other control information which may be used for uplink transmissions such as power control DCI.

The situation is different for downlink grants. In case of control information concerning downlink transmission, self-scheduling may be advantageous. In this scenario, the control signaling and the transmission of the data traffic is performed on one and the same carrier, in the same direction, and preferably in the same unit such as in the same subframe.

However, if the UL control signaling for an LBT carrier is received via cross-indicating on another (non-LBT) component carrier whereas the DL control signaling is received via self-indicating on an LBT carrier, additional blind decoding effort is created for the UE due to the size alignment of DCI format 0 (for UL) and 1A (for DL). In particular, both DCI formats may be detected on the same cell and on a different cell, but after successful blind decoding, UL grants from the same cell and DL grants from a different cell would be seen as invalid and therefore be discarded which results in wasted effort. In other words, since DCI format 0 and DCI format 1A (cf. background section, tables 1 and 2) have the same size, when attempting decoding for that size, both formats are received.

Figure 1:
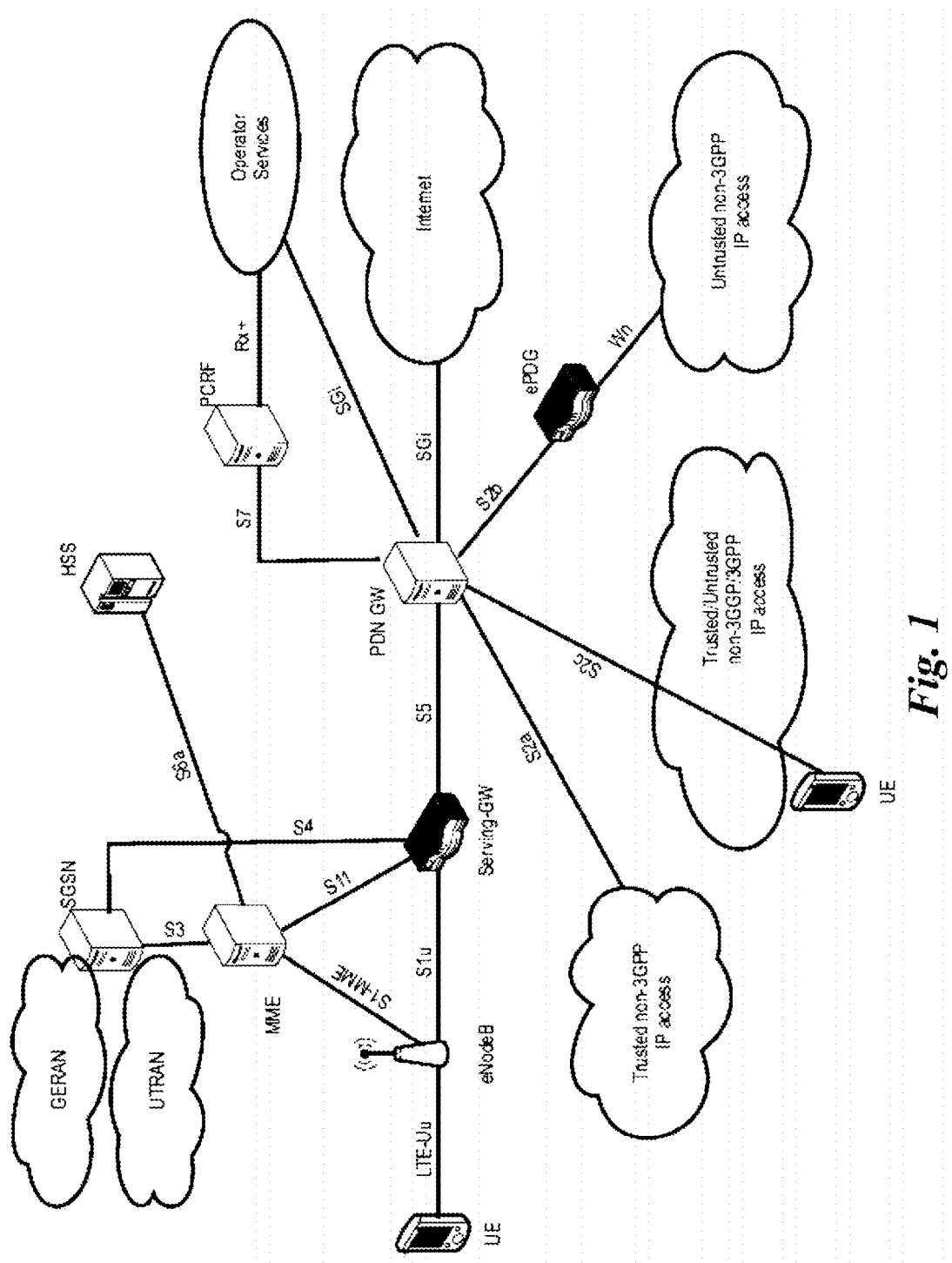
FIG. 1 shows an exemplary architecture of a 3GPP LTE system.
Figure 2:
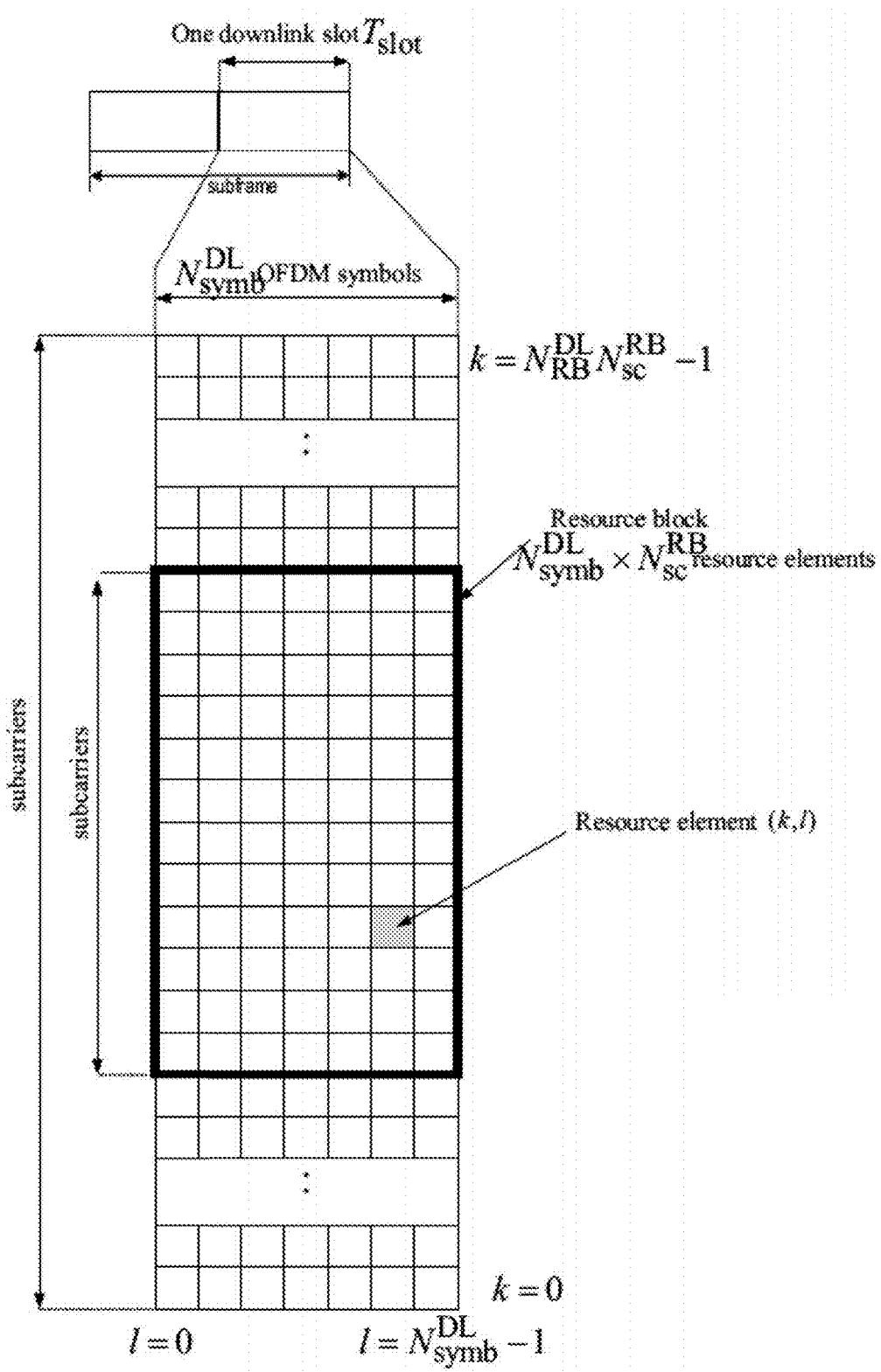
FIG. 2 shows an exemplary downlink resource grid of a downlink slot of a subframe as defined for 3GPP LTE (Release 8/9).
Figure 3:
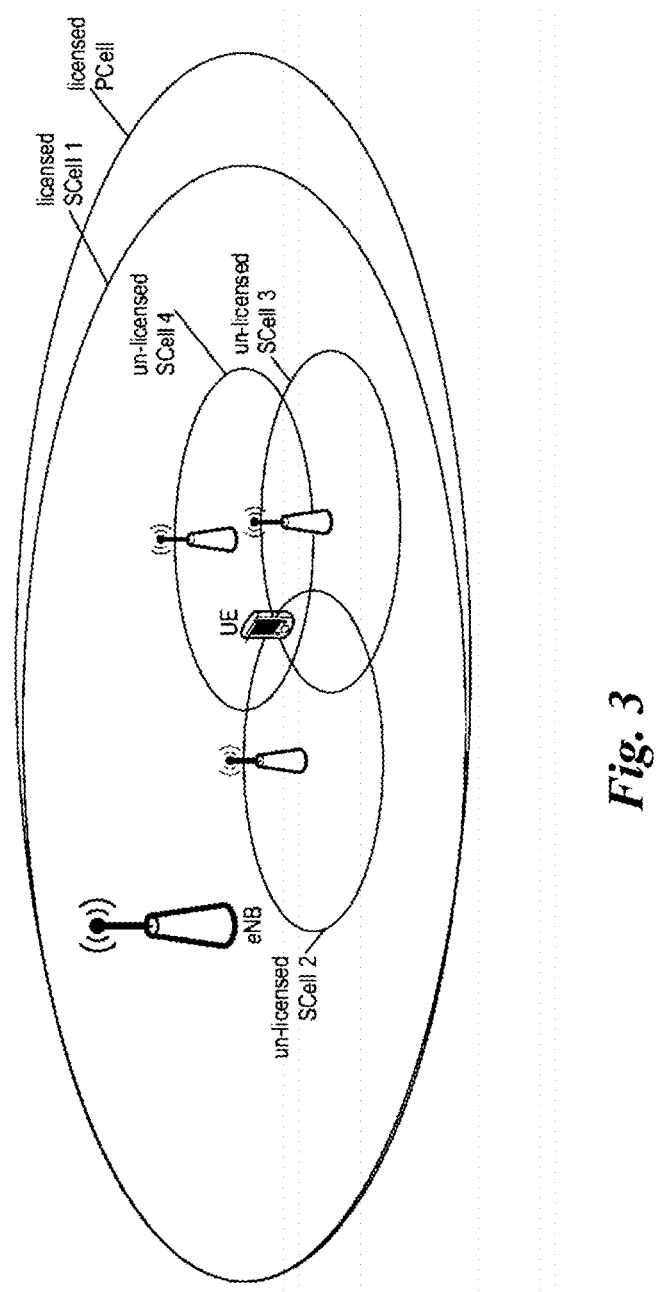
FIG. 3 illustrates an exemplary licensed-assisted access scenario, with various licensed and unlicensed cells.
Figure 4:
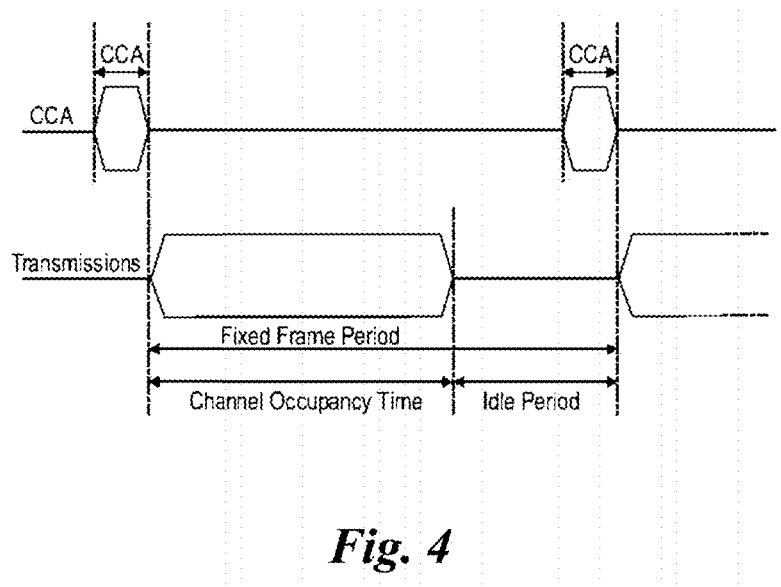
FIG. 4 illustrates schematically the transmission timing on an unlicensed band, including the different periods, Channel Occupancy Time, Idle Period, and Fixed Frame Period.
Figure 6:
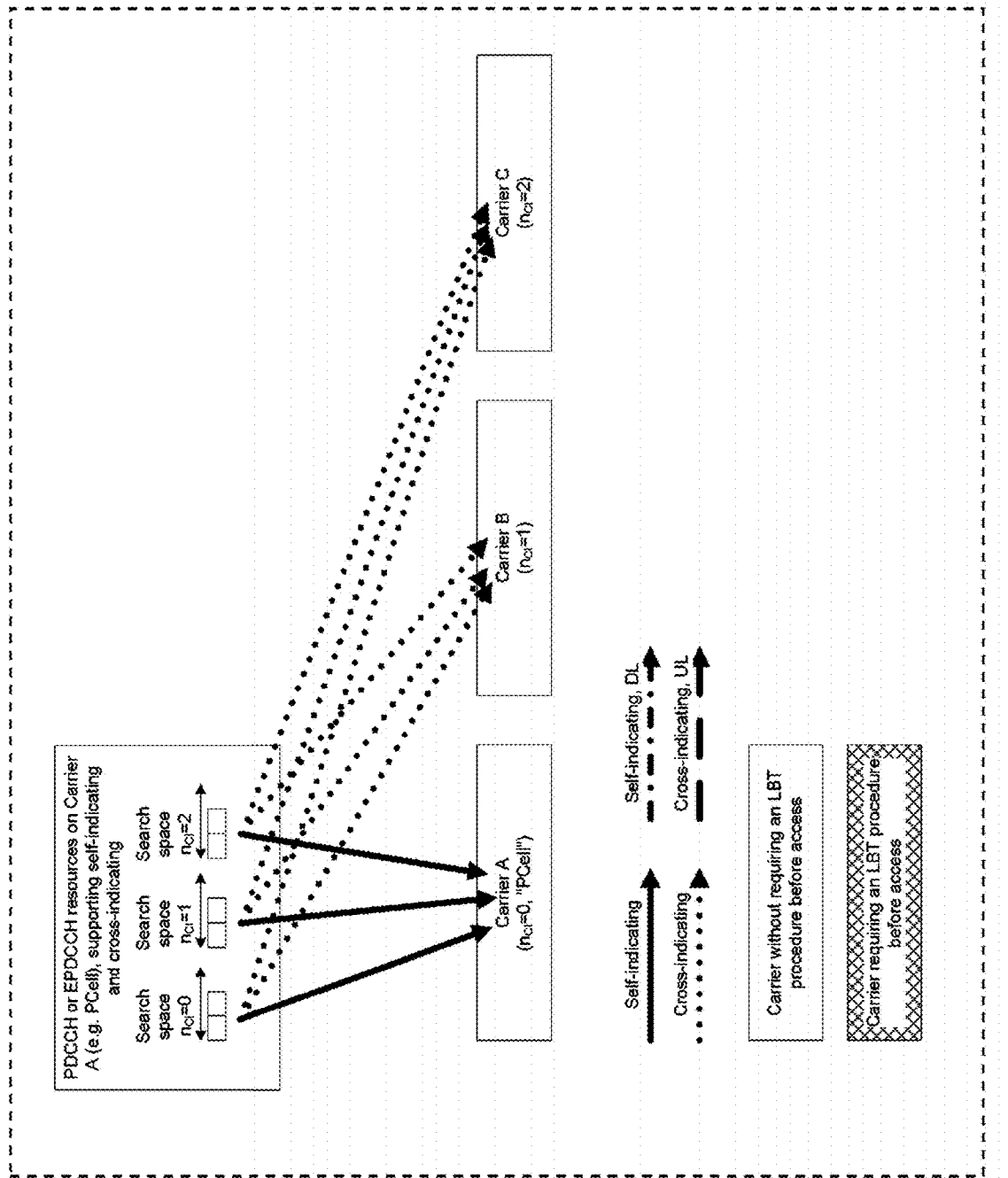
FIG. 6 is a schematic drawing illustrating relations between self-indicating and cross-indicating DCIs for the case of a plurality of component carriers.

FIG. 6 exemplifies relations between self-indicating and cross-indicating DCIs for the case of a plurality of component carriers, and the search space relations assuming that a single cell is scheduling/indicating three cells (or, in general a single cell is used to carry control information for three cells). The cell carrying all the DCIs is in this example identical to the PCell, and carries three—potentially overlapping—UE-specific search spaces (USS). This cell carrying the DCI may also be called "Scheduling Cell", even though not all DCIs transmitted in such cell are necessarily for scheduling data transmission. The DCI may also carry TPC commands without including grants, eIMTA reconfiguration or other signaling information used to configure data transmission. For the sake of simplicity, only the USSs are shown in FIG. 1, the common search space is not shown explicitly. In addition, so far an EPDCCH is only applicable to USS as well—a common search space is not currently supported by EPDCCH. As shown in FIG. 6, for each carrier that can be indicated from a cross-scheduling cell, one (UE-specific) search space is created, even though two or more of these search spaces might partially or in rare cases completely overlap (be identical due to the definition of a search space in LTE and LTE-A). In FIG. 6, the search spaces are identified by the value n_CI of the carrier identification.

As can be seen in FIG. 6, the term "self-scheduling" and "cross-scheduling" are not necessarily mutually exclusive, nor complementary. For example, the PCell is in this case at the same time self-scheduling and cross-scheduling cell, while the other two cells/carriers are neither self-scheduling nor cross-scheduling.

A "carrier indicator field" (CIF) may be included in the respective DCI formats (see 36.212 and the background section above) and indicates for which carrier the control information carried by the DCI is applicable. In particular, in FIG. 6, the carrier indicator (CI) determines whether a DCI carried on the carrier A is applicable to carrier A, B, or C. The value indicated in the CIF is identical to the corresponding n_CI value—e.g., in the example of FIG. 6, the CIF can take the values $\{0, 1, 2\}$. With each CIF value, a search space is associated, i.e., for each CIF value a subset of CCEs is defined which are monitored to receive DCI. It should be noted that the presented embodiments are not restricted to the identity of n_CI and the CIF values. As long as a CIF serves to identify an intended carrier, the embodiments can be used without issues. In other words, the present disclosure is not limited to use of a particular indication such as n_CI value for the purpose of distinguishing between carriers. There may be any indicator which enables distinguishing between the carriers such as CIF.

Assuming that all sizes for the DCI blind decoding are independent of the target carrier's n_CI value, i.e., that a DCI format size to be detected for a first carrier is identical to the DCI format size for a different carrier, a self-indicating DCI can be transmitted (is detected) within any of the three search spaces identified by n_CI=$\{0, 1, 2\}$ without increasing the blind decoding complexity significantly, since the UE has to monitor all three search spaces on the scheduling carrier (carrier A of FIG. 6). In addition, any cross-indicating DCI can be transmitted (detected) within any of the three search spaces identified by n_CI=$\{0, 1, 2\}$ as well without increasing the blind decoding complexity significantly. This relation is shown in FIG. 6 by the various arrows, where a solid arrow shows a self-indicating DCI (irrelevant whether for UL transmissions, DL transmission, or other purposes), while a dotted arrow shows a cross-indicating DCI (irrelevant whether for UL transmissions, DL transmission, or for other purposes). In this example, cross-indicating therefore is given when to the corresponding CIF has value of $\{1, 2\}$ in the DCI. In case that additional blind decoding complexity is acceptable, the requirement of equal size can be lifted without affecting the applicability of the presented embodiments.

FIG. 6 relates to component carrier aggregation as defined in Rel-10 and later of LTE which is a licensed band system. Under assumption that unlicensed band is to be integrated into the LTE as one of the component carriers, similar approach is also to be applied to an LBT carrier. For instance, in FIG. 6, carrier C may be an LBT carrier. Such integration of LBT carrier into a non-LBT system thus also leads to a necessity of providing another search space associated with the CI of the LBT carrier.

It is noted that the search space as described above may correspond to PDCCH and/or to EPDCCH. EPDCCH is an enhancement of PDCCH region as described above. Thus, all embodiments described herein are also applicable for any of PDCCH and EPDCCH.

The present disclosure is generally applicable not only to PDCCH and EPDCCH but for any channel carrying DCI. For instance, the backhaul link between a base station and a relay may also use this approach.

Figure 7:
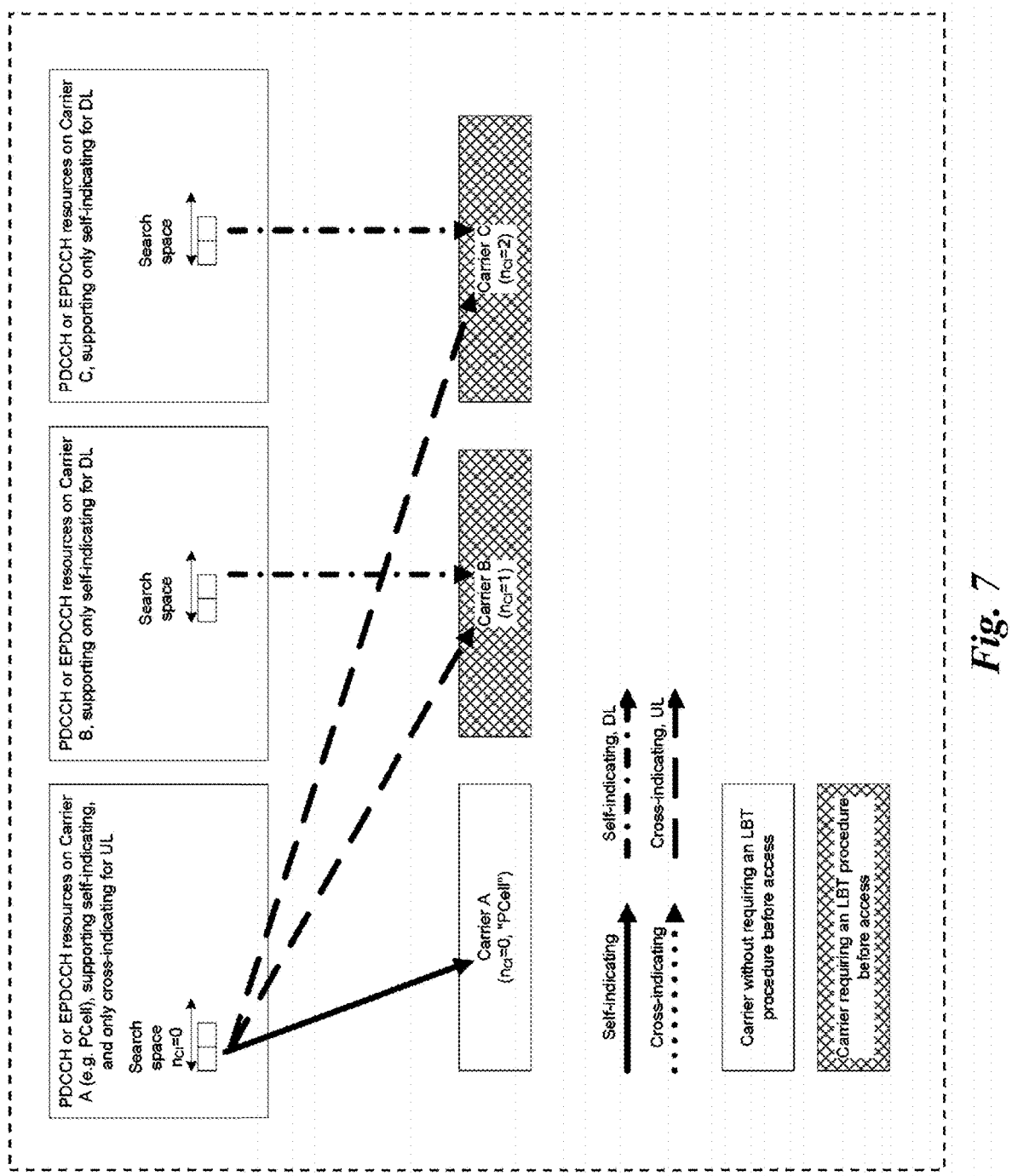
FIG. 7 is a schematic drawing illustrating exemplary relation between self-indicating and cross-indicating DCIs for one non-LBT carrier and two LBT carriers.

FIG. 7 shows behavior according to an embodiment for one licensed carrier (e.g., PCell) that supports self-indicating, as well as signaling for two other carriers that require an LBT procedure before access. In particular, carrier A with carrier identification having value 0 is a licensed band carrier on which LBT is not necessary. Carriers B and C with respective carrier identifier values of 1 and 2 are LBT carriers.

In this example, carrier A is a PCell which supports transmission of self-related signaling (shown by a solid arrow), as well as transmission of signaling related to UL transmissions on the two other cells (carriers B and C, identified by n_CI=1 and n_CI=2 respectively, shown by dashed arrows). DL transmissions on carrier B and C, on the other hand, can only be scheduled by a self-indicating DCI (shown by dash-dotted arrows), i.e., where the corresponding DCI is transmitted/detected within a search space located on resources of the corresponding LBT carrier B and C, respectively.

In contrast to FIG. 6, FIG. 7 shows that on carrier A only one single (UE-specific) search space exists. In other words, according to the present disclosure, any search space on a cross-indicating carrier is associated with a carrier indication of a non-LBT carrier. LBT carriers are not allowed to spawn any additional search space on the cross-indicating carrier which carries signaling for these LBT carriers.

According to the present disclosure, thus a method is provided for transmitting data in subframes of a wireless communication system, the wireless communication system supporting aggregation of a plurality of component carriers and an additional carrier accessible by a listen before talk approach. The wireless communication system may be a cellular system such as LTE-A, operating in licensed band. If operating in licensed band, no LBT is necessary since the licensed resources are only used by the system they are licensed for. Thus, as soon as a resource is scheduled, the transmission can take place on the scheduled resource without further checking their usage by someone else. It is noted that LTE-A is only an example, but the present disclosure is equally applicable to any other licensed band system which also makes use of unlicensed bands, on which LBT is to be performed before the transmission.

Carrier aggregation has been described in the background section above. Accordingly, a plurality of component carriers corresponds to a plurality of cells, providing each a separate time-frequency resource grid. The term component carrier is not to be confused with the term sub-carrier: each component carrier having an own resource grid is also formed by the set of sub-carriers. With the term "component carrier" in the following thus aggregated carriers of the licensed (non-LBT) will be denoted. As "additional carrier" or LBT carrier, carriers will be denoted which require LBT such as unlicensed band carriers.

Figure 8:
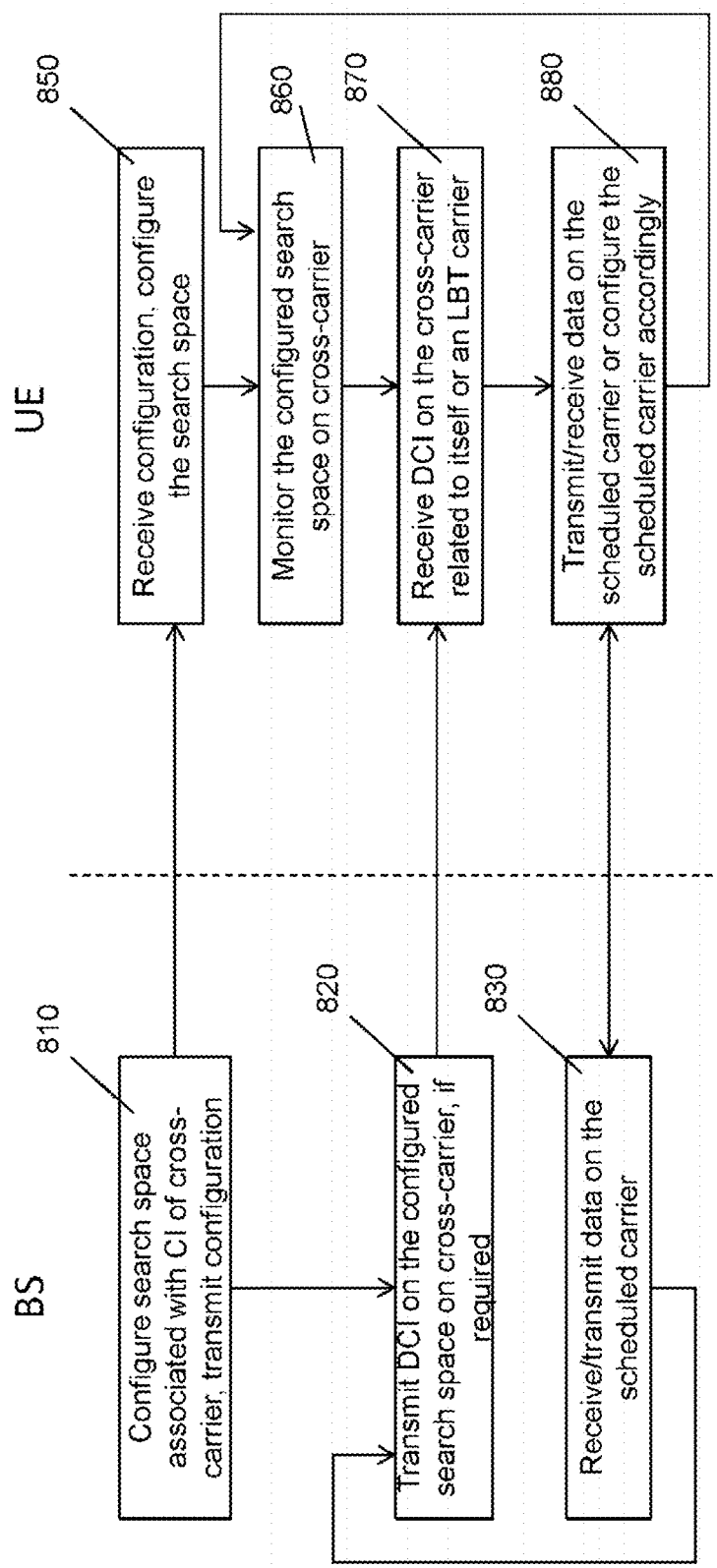
FIG. 8 is a flow diagram illustrating methods performed at the terminal and base station.

A method of the present disclosure is illustrated in FIG. 8 and includes the following steps performed at the DCI receiver (UE): monitoring 850 a search space on a cross-scheduling component carrier for detecting 870 downlink control information having a carrier identification field indicating the cross-scheduling component carrier as well as for detecting 870 downlink control information with the carrier identification field indicating the additional carrier, wherein the search space is specified by a subset of resources, associated with carrier identification of the cross-scheduling component carrier but is not associated with carrier identification of the additional carrier, and receiving or transmitting 880 data on the carriers in accordance with the received downlink control information. The monitoring of the search space is performed regularly as configured, i.e., on the resources assigned to the search space associated with the cross-indicating carrier (its CIF value).

It is noted that the final processing step 880 generally includes applying the configuration received within the DCI in step 870. This applying may be, for instance, transmission of data if the DCI included UL grant, reception of data if the DCI included a DL grant or any other configuration of the carrier for which the DCI was issued, e.g., power control configuration.

As can be seen in FIG. 8, the search space may be configured at first. This configuration may be performed semi-statically by higher layers. For instance, this configuration may be performed by the RRC protocol when configuring or reconfiguring the corresponding bearer using PDSCH or PUSCH. Accordingly, the UE receives 850 the configuration and configures the search space accordingly.

Correspondingly, a method to be executed at the DCI transmitter (base station, BS) side is provided, including the steps of: transmitting 820 in a search space on a cross-scheduling component carrier downlink control information having a carrier identification field indicating the cross-scheduling component carrier as well as downlink control information with the carrier identification field indicating the additional carrier, wherein the search space is specified by a subset of resources, associated with carrier identification of the cross-scheduling component carrier but is not associated with carrier identification of the additional carrier, and receiving or transmitting 830 data on the carriers in accordance with the transmitted downlink control information.

The search space, i.e., the resources assigned to the search space on the component carrier, may be configured 810 by the base station before the transmission of the DCIs and transmission/reception of data accordingly as mentioned above. The base station transmits a DCI for a certain UE in the configured search space if there are data to be transmitted or received by the UE or if there is signaling for the UE concerning configuration for data transmission or reception.

In compliance with the above described methods, a carrier, identifiable within DCI by its carrier indication and requiring an LBT procedure before access to the granted resources does not spawn a (UE-specific) search space on a cross-indicating scheduling cell. Consequently, only one (UE-specific) search space is shown for carrier A in FIG. 7. This search space is used for the entire self-indicating of carrier A and cross-indicating of carriers B and C.

Since different carriers can be indicated from within the search space(s) of carrier A, a DCI transmitted/detected therein needs to include the CIF, in order to determine for which of the carriers A, B and C corresponding to n_CI values of 0, 1, 2, respectively the control information is destined. Carriers B and C each support only self-indication for DL transmissions. Thus, the DCIs related to DL for carriers B and C cannot be cross-indicated on another carrier. Consequently, according to an embodiment, no CIF is included in the corresponding DCIs related to DL of carriers B and C. Not including a CIF is beneficial since it allows a more compact DCI size, which has benefits in terms of small control overhead, larger control information coverage, or a good error resilience of the control information against errors introduced by, e.g., the (radio) channel. It is noted that the present disclosure is not limited to the above embodiment. A CIF could be still present on the self-indicating carrier.

In summary, according to this embodiment, the downlink control information for the additional carrier, transmitted in the search space(s) of the cross-scheduling cell, only includes grants for uplink but not for downlink. The UE thus also performs monitoring a search space on the additional carrier for detecting downlink control information and relating to downlink data reception, and receives data in accordance with the downlink control information detected. Advantageously, the downlink control information received on the additional carrier has no carrier identification field.

According to an embodiment, a configuration based on downlink control information detected in the search space of the cross-scheduling cell for the additional carrier is applied for the transmission only in case of grants for uplink but is discarded in case of grants for downlink. In other words, if a DCI with downlink configuration for the LBT carrier is received cross-indicated in the search space of the cross-scheduling carrier, then it is ignored and the control information included therein is not applied for the reception of data.

Figure 9:
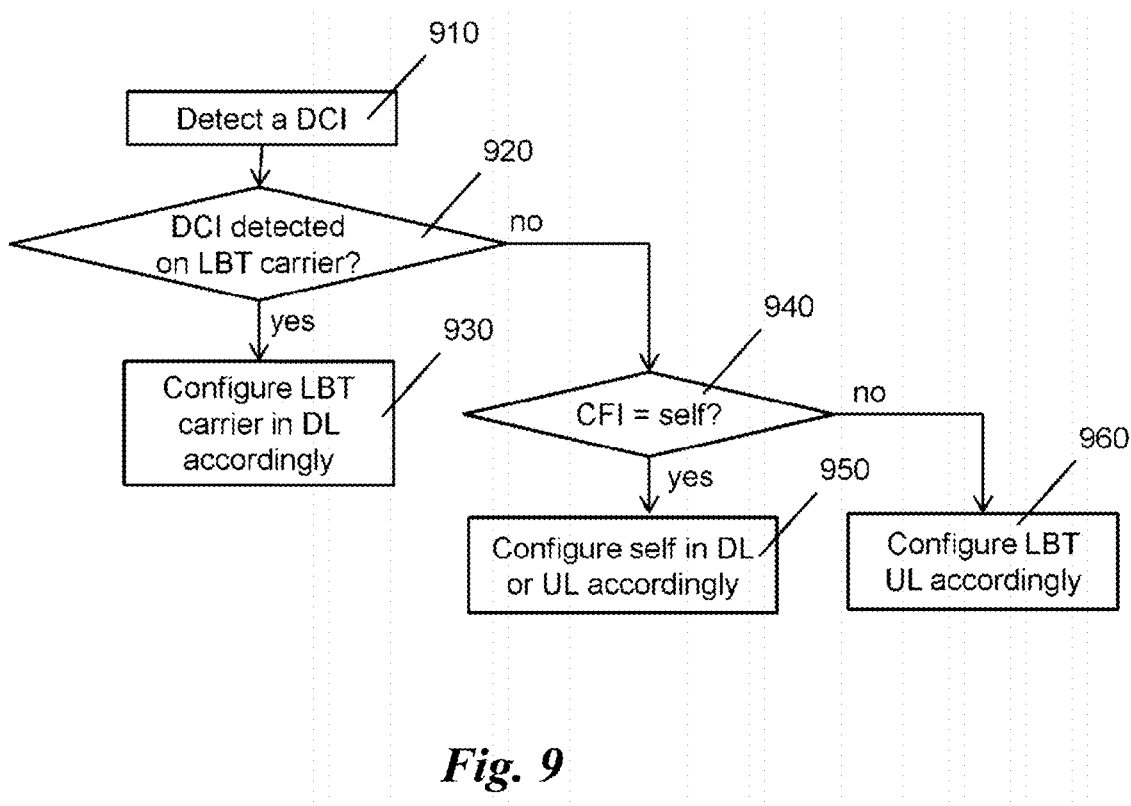
FIG. 9 is a flow diagram illustrating handling of DCIs received on different carriers and relating to different carriers.

For instance, based on FIGS. 7 and 8, the UE may then perform the following (further) steps illustrated in FIG. 9:
  monitoring 860 of all user-specific search spaces, i.e., the search spaces on the cross-carrier A (for detecting downlink DCIs for carrier A and uplink DCIs for carriers B and C) as well as on the additional carriers B and C (for detecting downlink DCIs for the respective carriers B and C).
  If a DCI is detected 870 on carrier A:
    If the CIF in the detected DCI indicates carrier A (meaning self-indicating), then the detected DCI is applied for carrier A. This may include any UL or DL configuration such as UL or DL grant, control information for configuring UL or DL transmission or the like.
    If the CIF in the detected DCI indicates carrier B, then the detected DCI is applied for carrier B assuming it is a UL indication (since in this embodiment, DL DCIs are always self-indicating, i.e., related to the carrier on which they are transmitted).
    If the CIF in the detected DCI indicates carrier C, then the detected DCI is applied for carrier C assuming it is a UL indication (since in this embodiment, DL DCIs are always self-indicating, i.e., related to the carrier on which they are transmitted).
  If a DCI is detected on carrier B, the detected DCI is applied for carrier B assuming it is a DL indication.
  If a DCI is detected on carrier C, the detected DCI is applied for carrier C assuming it is a DL indication.

This behavior is further illustrated in general in FIG. 9. If a DCI is received, the UE proceeds differently, depending on the carrier on which the DCI is received. If the DCI is received on an LBT carrier (yes in step 920), the UE knows that the DCI can only be self-indicating DL DCI, i.e., DL DCI related to the LBT on which it was detected. Thus, such DCI does not have to have CIF. Basically, the DCI in this case would also not need to indicate whether it relates to UL or DL. However, currently, as can be seen from Tables 1 and 2 above, DCI Format 0 and 1A include specification of the format. Based on the format, it is additionally clear whether it relates to UL or DL. The format of the DCI is beneficially kept in the corresponding field for the reason of compliancy with the existing formats. In such case, this additional information may help to check the correct reception of the DCI (no DCI with UL grants should be received. If received, it should not be used for configuring the transmission).

Currently, in LTE an uplink component carrier is always linked to a corresponding downlink carrier. Accordingly, an uplink and the corresponding downlink carrier have the same CIF value. However, it is noted that the present disclosure is not limited to LTE or to LTE applying concept to LBT carriers same as to the component carriers. Thus, the present disclosure is also applicable if CIF is also direction specific. Thus, the decision on whether an UL or DL carrier in indicated may be performed based on the CIF value.

The UE configures the DL on the LBT carrier in accordance with the DCI received in step 930.

If, on the other hand, the DCI is received on a non-LBT cross-indicating carrier (no in step 920), the UE judges whether the CIF value corresponds to the value of the non-LBT cross-indicating carrier (yes in step 940). If affirmative, the UE configures the non-LBT cross-indicating carrier accordingly in step 950, for UL or DL depending on the DCI format. If the CIF value corresponds to the value of an LBT carrier, the LBT carrier in UL is configured accordingly in step 960. The UE knows that only UL and no DL configuration may be received in this DCI and may use this information for checking the correct reception. Moreover the length of the DCI formats to be detected is known a priori by the UE as a function of the configured transmission modes for UL and DL, and the applicable RNTI for the DCI format. Consequently the successfully detected length of a DCI is an indication for the type of the DCI and its content.

Figure 10:
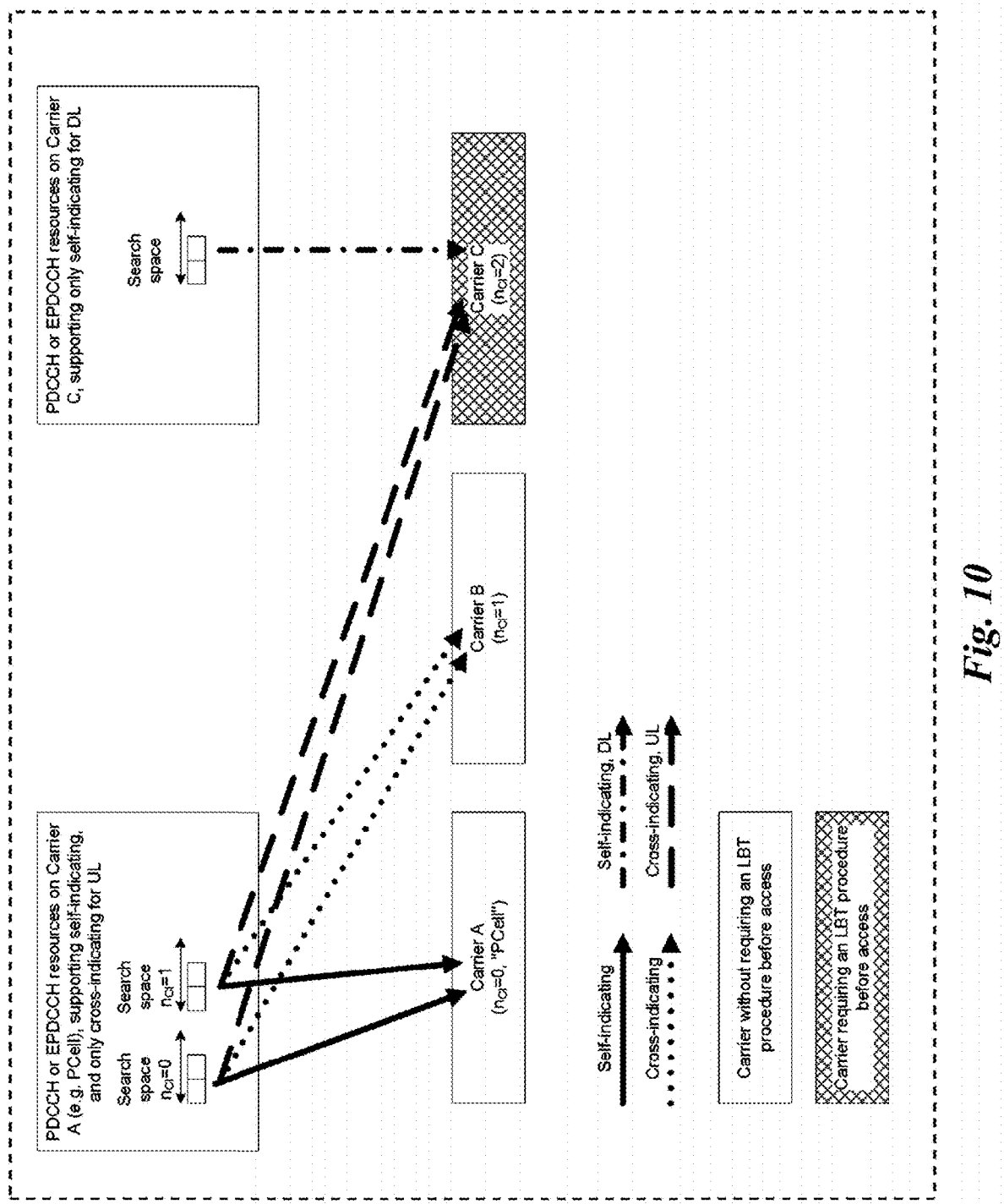
FIG. 10 is a schematic drawing illustrating exemplary relation between self-indicating and cross-indicating DCIs for two non-LBT carrier and one LBT carrier.

FIG. 10 shows another example configuration based on the present disclosure. In particular, FIG. 10 illustrates UE (and also BS) behavior for two licensed carriers (e.g., PCell and one SCell), where the PCell supports indicating itself, as well as the other licensed carrier, as well as another carrier that requires an LBT procedure before access. It shows the behavior for the exemplary case that one cell, for example the PCell A identified by n_CI=0, supports signaling for itself (shown by the straight arrows), as well as signaling for another licensed cell (carrier B identified by n_CI=1, shown by dotted arrows), as well as signaling UL-related control information on an unlicensed cell (carrier C, identified by n_CI=2, shown by dashed arrows). Moreover, DL-related configuration of carrier C can only be indicated by self-indicating DCI (shown by a dash-dotted arrow), i.e., where the corresponding DCI is transmitted/detected within a search space on that LBT carrier.

Similar to FIG. 9, FIG. 10 shows that in Carrier A only two (UE-specific) search spaces exist, since Carrier A supports indication of two carriers without requiring an LBT procedure before access (Carrier A and Carrier B). Even if further carriers requiring an LBT procedure before access can be indicated on carrier A (e.g., a carrier C, or further carriers D and E not shown in the figure), no (UE-specific) search spaces corresponding to the carrier indication of such carriers (n_CI=2 for C, and possibly n_CI=3 for D whereas n_CI=4 for E) are thereby spawned in carrier A.

Since different carriers can be indicated from within the search spaces of carrier A, the DCI transmitted/detected therein need to include the CIF, in order to determine particularly whether an UL transmission is indicated for carrier A, B, or C corresponding to n_CI values of 0, 1, 2, respectively. In other words, CIF is useful to specify for which carrier the DCI configuration is to be applied.

As carrier C supports only self-indications for DL transmissions, there is no specific need to include a CIF in the corresponding DCI. However a CIF could be present in case it is desired, as a matter of configuration. Not including a CIF is beneficial since it allows a more compact DCI size, which has benefits in terms of a small control overhead, larger control information coverage, or a good error resilience of the control information against errors introduced by, e.g., the (radio) channel, as already mentioned above.

Following FIG. 9, a UE would then perform the following procedure.

If a DCI is detected in carrier A:
  If the CIF in the detected DCI indicates carrier A or B (non-LBT carrier), the detected DCI is applied for carrier A or B, respectively (as indicated by the CIF), and UL/DL transmission or another configuration are determined according to the detected DCI format.
  If the CIF in the detected DCI indicates carrier C (LBT carrier), the detected DCI is applied for uplink transmission/configuration of carrier C, assuming that it is a UL indication.
If a DCI is detected in carrier C, the detected DCI is applied for carrier C assuming it is a DL indication (configuration).

The control information signaling can be further improved in accordance with another embodiment described in the following and combinable with the above described embodiments and exampled. In particular, the aim is to maintain the total blind decoding effort limited, preferably not exceeding the example of FIG. 6.

In this embodiment, in particular, DCIs transmitted on the cross-indicating cell for LBT carriers are aligned in size to one of the existing DCI sizes in the cross-indicating cell. In other words, the monitoring 850 is performed for the downlink control information for the cross-scheduling component carrier and the downlink control information for the additional carrier, wherein both DCIs have the same predetermined size. This may be achieved, for instance by using the DCIs already defined to have the same size such as DCI Format 0 and DCI Format 1A.

For the remaining formats which do not have the corresponding sizes, the size of the downlink control information carrying an uplink grant for the additional carrier is advantageously padded to the size of a downlink control information carrying a downlink grant for the cross-scheduling carrier and/or other component carriers. In particular, the downlink control information, DCI, carrying the uplink grant for the additional carrier corresponds to DCI Format 0 of 3GPP LTE-A and its size is padded to match the size of a DCI larger than DCI Format 0 and carrying downlink grants for the cross-scheduling carrier and/or other component carriers.

This is facilitated by matching certain sizes of DCI formats, where the preferred method is that the smaller DCI is padded to the larger DCI format by adding bits. If those padding bits have a predefined or predetermined value, they can further be utilized to improve correct detection of the DCI.

If a first DCI format of size S1 should be matched to the size S2 of a second DCI format and where S1<S2, the first DCI format is padded with a number of p padding bits so that S1+p=S2. For simplicity, unless otherwise noted, the following description implies such a padding by simply stating that S1=S2. Obviously, if the sizes are equal without any padding bits, the case described by S1=S2 does not require padding to match the sizes (cf., e.g., DCI Format 0 and DCI Format 1A).

It is noted that even though FIG. 10 merely shows component carrier A being a cross-indicating carrier and component carrier B for which signaling is only received on carrier A, this arrangement is not limiting for the present disclosure. Any configuration may be supported. For instance, carrier B may also apply self-scheduling, for instance only for one direction such as downlink or for both uplink and downlink. For the case that carrier B is completely self-scheduling, in terms of FIG. 10 Carrier A would only schedule itself and carrier C, while carrier B would only schedule itself. Correspondingly the search space determined by n_CI=1 would be non-existent on carrier A, while a search space would exist on carrier B for the self-indication/self-scheduling. Alternatively, carrier B may also be cross-scheduling carrier in addition to carrier A to indicate carrier C. However, this may be a less interesting configuration due to a higher possibility of errors by false DCI detection.

Figure 11:
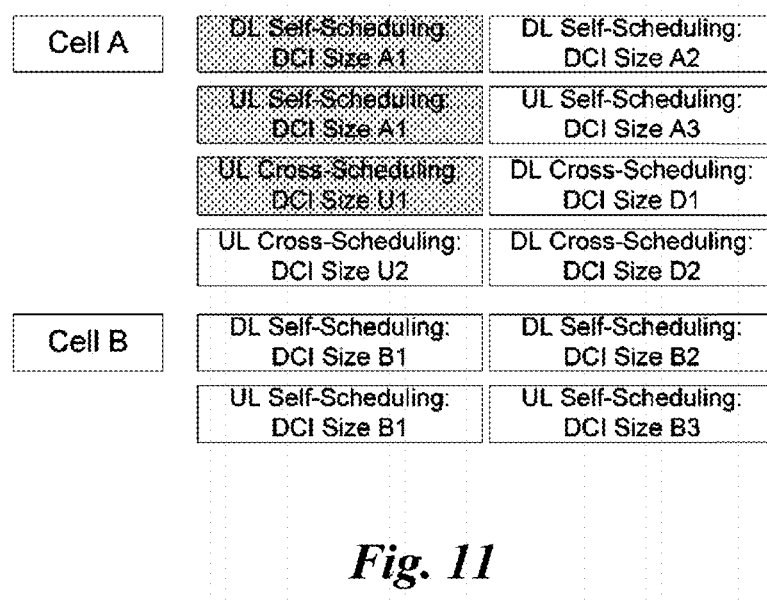
FIG. 11 is a schematic drawing illustrating sizes of DCI for different employment scenarios.
Figure 12:
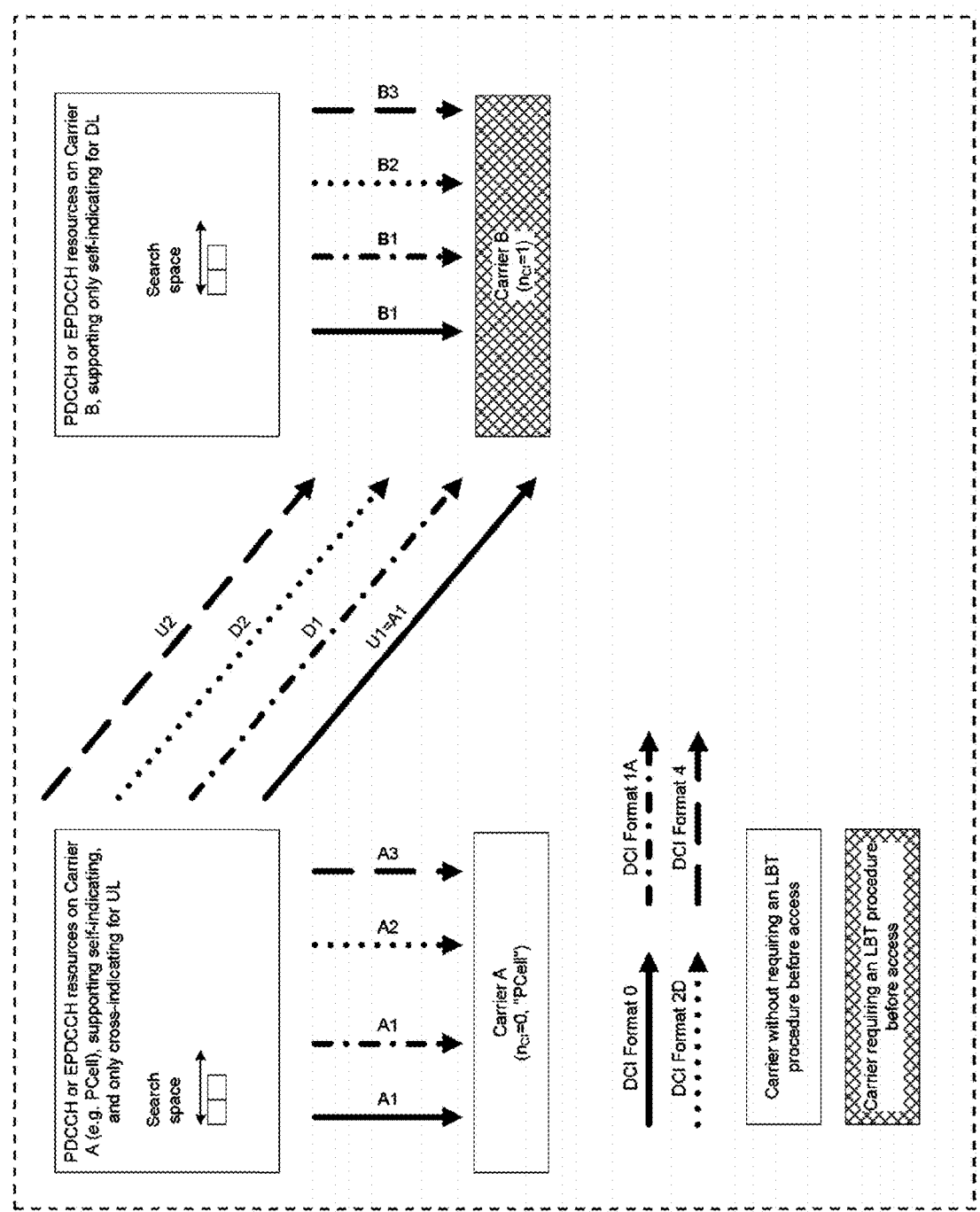
FIG. 12 is a schematic drawing illustrating sizes of DCI depending on the carrier on which the DCI is carried and on the carrier to which it relates.

FIG. 11 illustrates DCI sizes applicable for formats used on the LBT and non-LBT carriers. Moreover, FIG. 12 shows, where the respective DCI sizes are applied. In particular, the following format sizes are shown:

A1 is a size of a DCI on a non-LBT carrier for scheduling UL or DL on the non-LBT carrier and corresponding to DCI Format 0 or 1A.

A2 is a size of a DCI on a non-LBT carrier for scheduling DL on the non-LBT carrier and corresponding to DCI Format 2D.

A3 is a size of a DCI on a non-LBT carrier for scheduling UL on the non-LBT carrier and corresponding to DCI Format 4.

B1 is size of a DCI on a LBT carrier for scheduling DL on the LBT carrier and corresponding to DCI Format 0 or 1A, possibly further adjusted. (It is noted that DCI Format 0 should not occur under the assumption that carrier B merely allows self-indicating for downlink but not uplink).

B2 is size of a DCI on a LBT carrier for scheduling DL on the LBT carrier and corresponding to DCI Format 2D, possibly further adjusted.

B3 is size of a DCI on a LBT carrier for scheduling UL on the LBT carrier and corresponding to DCI Format 4, possibly further adjusted. (It is noted that DCI Format 4 should not occur under the assumption that carrier B merely allows self-indicating for downlink but not uplink).

U1 is a size of a DCI on a non-LBT carrier for scheduling UL on the LBT carrier and corresponding to DCI Format 0 having size equal to size A1 above.

U2 is a size of a DCI on a non-LBT carrier for scheduling UL on the LBT carrier and corresponding to DCI Format 4.

D1 is a size of a DCI on a non-LBT carrier for scheduling DL on the LBT carrier and corresponding to DCI Format 1A. (It is noted that DCI Format 1A should not occur under the assumption that for carrier B only self-indicating is allowed for downlink)

D2 is a size of a DCI on a non-LBT carrier for scheduling DL on the LBT carrier and corresponding to DCI Format 2D. (It is noted that DCI Format 2D should not occur under the assumption that for carrier B only self-indicating is allowed for downlink)

If formats D1, D2, B1 (DCI Format 0), B3 are present, it shall cause more blind decoding attempts. Thus, it is more beneficial not to perform blind decoding attempts for B3/D1/D2. However, the present disclosure is not limited thereto and as shown above, other configurations are also possible.

A1-A3, B1-B3, D1, D2, U1, and U2 are respective sizes of DCI format shown in FIG. 12, and the relation between these sizes is as follows:

$$U1=A1(A1\neq A2\neq A3, U1\neq U2, D1\neq D2)$$

In this exemplary case 1, the DCI size for UL cross-indication (U1) is identical to the DCI size for DL and UL self-indication (A1), which is illustrated by shading the corresponding DCIs in FIG. 11. Then a CIF is necessary to distinguish between scheduling cell A (DL/UL) and cell B (UL).

According to this example, U1=A1 are aligned to the size of the existing DCI format 0/1A for the scheduling cell. Since an uplink cross-indicating DCI format might need to include more/larger fields than the same uplink self-indicating DCI format, it may be advantageous that in order not to increase the size A1, some bits are removed from the uplink cross-indicating DCI in order to achieve U1=A1. The reason for possible need for including more fields or larger fields for cross-scheduling compared to self-scheduling is that additional control data may be necessary for instance for supporting asynchronous HARQ or further or enhanced features.

In other words, in this example the downlink control information, DCI, carrying the uplink grant for the additional carrier on the component carrier has the same size as the DCI carrying uplink grant for the component carrier on which the DCI is received, and the size of a resource block allocation field in the DCI carrying uplink grant for the component carrier on which the DCI is received is larger than the size of the resource block allocation field in the DCI carrying the uplink grant for the additional carrier on the component carrier.

One candidate field to remove bits is thus the RBA field. Removing bits from the RBA field would limit the frequency resource scheduling flexibility. However, this seems acceptable considering that mainly large resource assignments are desirable for carriers that require an LBT procedure before access.

In case that DL cross-indication by means of DCI format 1A should be supported as well (alternatively to the above described embodiment), another advantageous solution may be to set sizes D1=U1=A1 with an additional bit inside the DCI format to distinguish UL cross-indicating from DL cross-indicating (corresponding to D1, U1 sizes).

Additionally or alternatively, the cross-indicating DCI format 1A may be aligned in size to another self-indicating TM-specific DCI format, such as DCI Format 2D (resulting in D1=A2 and/or possibly D1=B2). In the latter case, the detected CIF is used to distinguish a cross-indicating DCI format 1A from a self-indicating DCI Format 2D. Here a cross-indicating DCI format 1A would be distinguished from a self-indicating DCI Format 2D by an additional information such as the CIF value.

The term "TM-specific" here denotes that formats, which are only used (and allowed, i.e., also recognized) for specific transmission mode configurations. In the context of the LTE, transmission modes are defined by a list of potential transmission schemes. TM-specific formats are formats which are applicable to not all transmission modes such as the above mentioned format 2D (not applicable to DL transmission modes 1-9) or other formats such as format 1 (not applicable to DL transmission modes 3-6, 8-10). In contrast DCI Format 1A is not a TM-specific DCI format since it is applicable to all defined DL transmission modes (1-10). For UL transmission modes, DCI Format 4 is TM-specific because it is not applicable to UL transmission mode 1, while DCI Format 0 is not TM-specific because it is applicable to all defined UL transmission modes 1-2. Generally a TM-specific DCI Format has a larger size than a non-TM-specific DCI Format because more detailed configurations are necessary to be conveyed (such as precoding information, multiple codeword information).

In other words, the size A1 corresponds to DCI Format 0/1A. Size A2 corresponds to TM-specific DL DCI Format, such as 2D. Size A3 also corresponds to TM-specific UL DCI Format, e.g., 4. Similarly, U1 corresponds to DCI Format 0/1A, whereas size U2 corresponds to TM-specific UL DCI Format, e.g., 4. Finally, size D1 is a size of the DCI Format 0/1A, whereas the size of D2 is size of a TM-specific DL DCI Format, e.g., 2D. B1/B2/B3 corresponds in this context to A1/A2/A3.

As another additional or alternative approach, DL cross-indicating may be supported by means of a cross-indicating TM-specific DCI format 2D that is aligned in size to the self-indicating DCI format 2D. Again the CIF is used to distinguish whether the DCI format 2D is self-indicating or cross-indicating.

In summary, the first example above relates to size alignment in which the size of DCIs transmitted on the component carrier for configuring uplink of the component carrier A1 is the same as the size of DCIs transmitted on the component carrier for configuring uplink of the additional carrier U1. Moreover, the same size alignment may also concern the size of DCIs transmitted on the component carrier for configuring downlink of the additional carrier D1.

Still further, this size alignment may also be applied between DCIs which are transmission mode specific between the cross-indicating downlink DCI D2 and the self-indicating downlink DCI of the cross-scheduling component carrier A2 and/or the additional component carrier B2.

In the following, a second example of size alignment may be defined as follows:

$$U1=A2(A1\neq A2\neq A3, U1\neq U2, D1\neq D2, U1\neq D1\neq D2)$$

Figure 14:
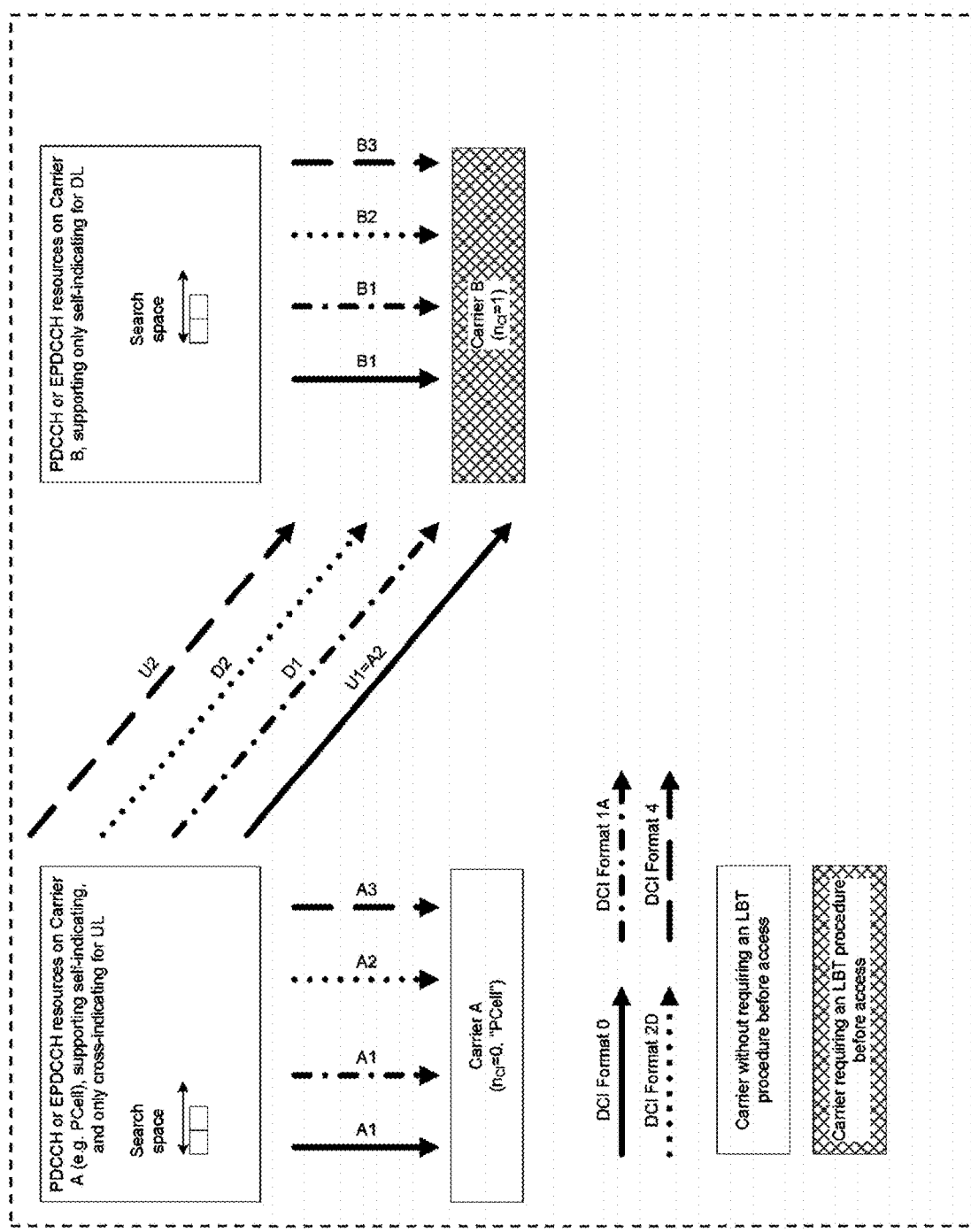
FIG. 14 is a schematic drawing illustrating sizes of DCI depending on the carrier on which the DCI is carried and on the carrier to which it relates.

This configuration is illustrated in FIGS. 13 and 14. In particular, in this example, the size of DCIs transmitted on the component carrier for configuring downlink of the component carrier A2 is the same as the size of DCIs transmitted on the component carrier for configuring uplink of the additional carrier U1. This can be achieved by adding padding bits to the size of U1 to achieve size A2 as already mentioned above.

In this case, the DCI size for UL cross-indication is identical to the (preferably TM-specific) DCI size for DL self-indication. In case that U1, D1, and D2 differ in size, it is clear that size U1 cannot correspond to a DL cross-carrier indicating DCI. In other words for U1, D1, and D2 of mutually different sizes, the CIF is sufficient to know that size U1 with the corresponding CIF entry constitutes an uplink cross-carrier DCI. If on the other hand, U1=A2=D1 or U1=A2=D2, and where the downlink cross-indicating DCI format corresponding to size D1 and D2 respectively should be supported, a further criterion such as an additional bit within the DCI, or a different RNTI, etc., would be necessary to distinguish an uplink cross-indicating DCI from a downlink cross-indicating DCI for the same carrier.

Accordingly, if U1=A2=D1 or U1=A2=D2, the DCI corresponding to U1, A2, and D1 includes an uplink/downlink indication specifying whether the DCI relates to UL or DL direction. This uplink/downlink indication may be carried in an uplink/downlink indication, preferably having size of 1 bit. Alternatively, the distinction between the uplink and downlink may be performed by applying specific RNTI for uplink and a different specific RNTI for uplink to scramble the PDCCH (CRC).

If only a downlink cross-indicating DCI format of size D1 is supported but not of size D2, for U1=A2=D2 no such further criterion is necessary. If only a downlink cross-indicating DCI format of size D2 is supported but not of size D1, for U1=A2=D1 no such further criterion is necessary.

In case DL cross-scheduling indication for the target cell is not supported/configured at all, then U1=D1 or U1=D2 would be possible since then again it would be clear that an UL cross-scheduling indicating DCI is transmitted by the eNB.

In the following, a third example of size alignment is presented for which:

$$U1=A3(A1 \neq A2 \neq A3, U1 \neq U2, D1 \neq D2, U1 \neq D1 \neq D2)$$

In other words, the size of the downlink control information format carrying an uplink grant for the additional carrier U1 is padded to the size of a downlink control information format carrying a uplink grant for the cross-scheduling component carrier and/or other carriers A3, B3 which is larger than the downlink control information format carrying an uplink grant for the additional carrier U1. This example assumes that there are two kinds of downlink control information formats carrying an uplink grant, namely a shorter format used for self-indicating and a longer format used for cross-indicating (such as DCI Format 0 and DCI Format 4).

Figure 16:
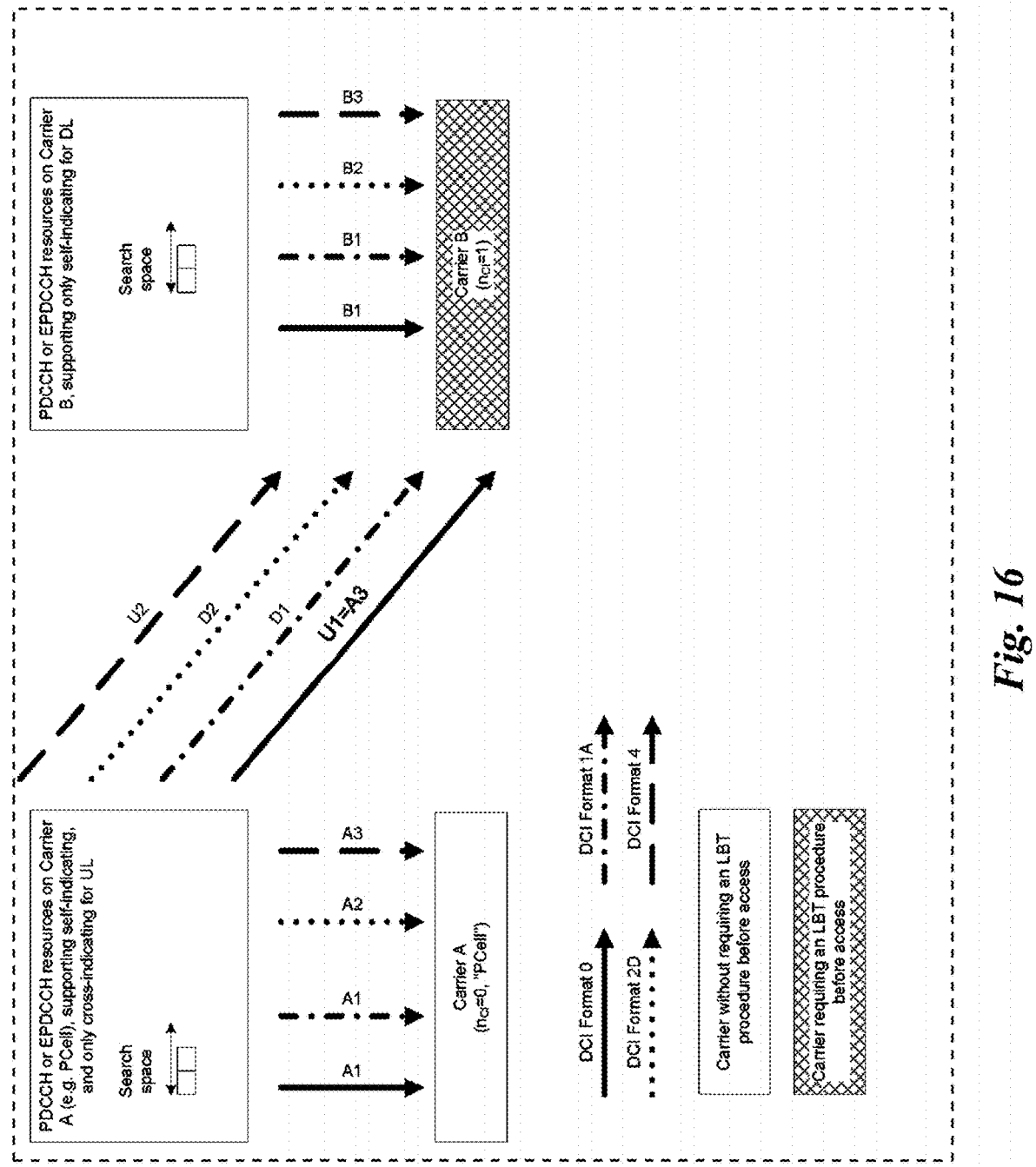
FIG. 16 is a schematic drawing illustrating sizes of DCI depending on the carrier on which the DCI is carried and on the carrier to which it relates.

This example is illustrated in FIGS. 15 and 16. In this case, the DCI size for UL cross-indication is identical to the (preferably "TM-specific") DCI size for UL self-indication, such as DCI Format 4. In case that U1, D1, and D2 having different sizes, it is clear that size U1=A3 cannot correspond to a DL cross-carrier indicating DCI. In other words for mutually different U1, D1, and D2 sizes, the CIF is sufficient to know that size U1 with the corresponding CIF entry constitutes an uplink cross-carrier assignment. If U1=A3=D1 or U1=A3=D2, a further criterion such as an additional bit within the DCI, or a different RNTI, etc., would be necessary to distinguish an uplink cross-indicating DCI from a downlink cross-indicating DCI for the same carrier. This may be an uplink/downlink indicator as described above.

In case DL cross-indication for the target cell is not supported/configured, then U1=A3=D1 or U1=A3=D2 is possible since then again it is clear that an UL cross-indicating DCI is transmitted by the eNB (base station).

Figures 17, 18A:
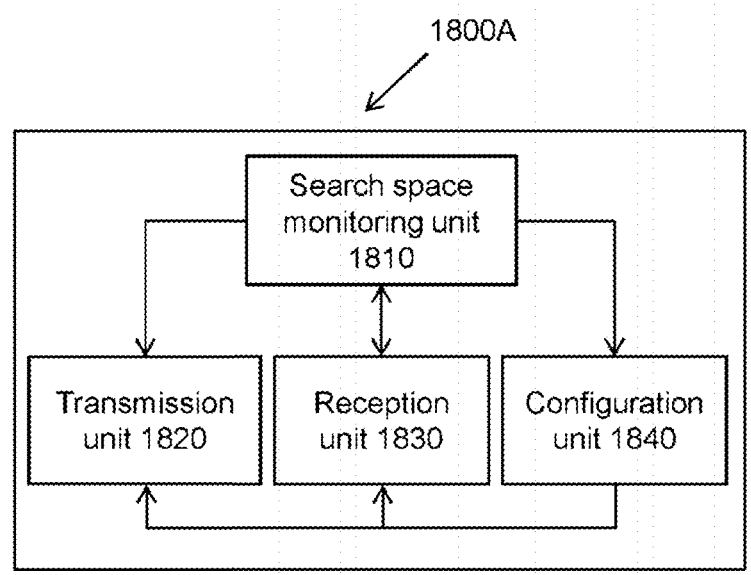
FIG. 17 is a schematic drawing illustrating DCIs for different employment scenarios.
FIG. 18A is a block diagram illustrating an exemplary device for implementing the present disclosure.

FIG. 17 summarizes formats available in a cell A which is a cross-indicating cell (cross-scheduling component carrier) and in cell B which is a self-scheduling cell (additional LBT carrier).

The above cases can be further adapted to match a second DCI format of size U2 (e.g., DCI Format 4) for UL cross-indication to one of the self-scheduling sizes A1/A2/A3 by replacing U1 by U2. However since generally we assume that U2>U1, especially matching U2=A1 by removing bits from fields of a UL cross-scheduling DCI compared to the UL self-scheduling DCI may become less attractive since important information might not fit anymore into the size A1. Then matching U2=A2 or U2=A3 would be preferred mechanisms—although depending on the numerology still a certain amount of removed bits might be necessary.

In case that two different DCI formats should be supported for UL cross-indications, it is necessary to have U1 and U2 with different sizes, in order to distinguish the two DCI formats. However in case that U1=max {A1, A2, A3} it may not be possible to convey all required information within the size U2 within the confines of U2=A1 or U2=A2 or U2=A3. In such a case, the preferred solution to distinguish the two different DCI formats is by adding preferably 1 'padding' bit to the second DCI format, which implies that in case U1=max{A1, A2, A3} then U2=U1+1.

It is noted that the present disclosure is not limited to the above exemplified DCI Formats 0, 1A, 2D and 4, which are merely exemplary. The disclosure related to DCI Formats 2D and 4, which are TM-specific DCI formats, can be applied to other TM-specific DCI Formats, such as DCI Formats 1, 1B, 1C, 1D, 2, 2A, 2B, 2C. Likewise, the disclosure related to DCI Formats 0 and 1A, which are not TM-specific DCI formats, can be applied to other non-TM-specific DCI formats.

Moreover, the above mentioned DCI format which does not include any scheduling information (grant) but merely a configuration concerning the respective carrier may be, for instance DCI Format 3 and 3A in LTE-A system. As the size of DCI Formats 3 and 3A is defined to be aligned to the size of DCI Format 0, i.e., a non-TM-specific DCI format, DCI Formats 3 and 3A are preferably follow the disclosure applicable to non-TM-specific DCI formats.

However, the present disclosure is not restricted to these LTE DCI formats. Rather, it is applicable for any DCI.

Figure 18B:
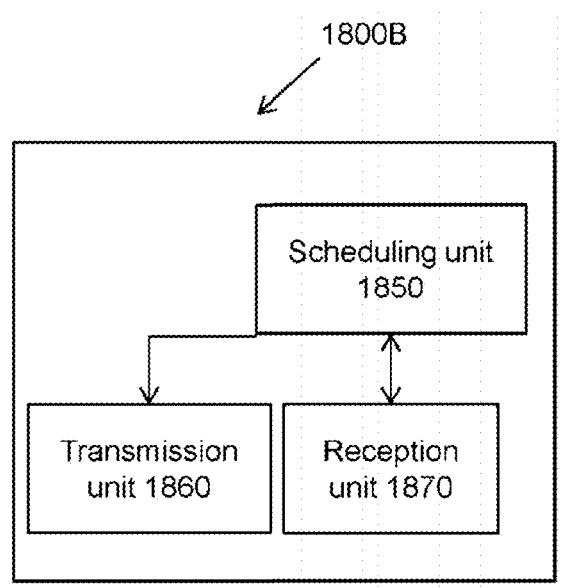
FIG. 18B is a block diagram illustrating an exemplary device for implementing the present disclosure.

FIG. 18A and FIG. 18B show exemplary apparatuses according to the present disclosure, which may be embodied in a terminal (UE) 1800A and in a base station (eNB) 1800B respectively.

In particular, an apparatus 1800A is provided for transmitting or receiving data in a wireless communication system, the wireless communication system supporting aggregation of a plurality of component carriers and an additional carrier accessible by a listen before talk approach. In particular, as discussed above, the wireless communication system may be an LTE-A system or any other radio access system which incorporates into its dedicated band a band shared with another system in which carrier sensing is necessary even before a scheduled transmission. The apparatus 1800A may be included in a UE, such as mobile phone, LTE interface card, IC for use in LTE interface of any device such as mobile phone, smart phone, computer, tablet or any other device. In particular, such apparatus 1800A comprises a search space monitoring unit 1810 for monitoring a search space on a cross-scheduling component carrier for detecting downlink control information having a carrier identification field indicating the cross-scheduling component carrier as well as for detecting downlink control information with the carrier identification field indicating the additional carrier, wherein the search space is specified by a subset of resources, associated with carrier identification of the cross-scheduling component carrier but is not associated with carrier identification of the additional carrier. In other words, the search space monitoring unit 1810 performs blind decoding on the preconfigured search space with the above described features and provides the decoded control information to further units which use it to perform configuration of or reception and/or transmission of data.

In particular, the apparatus 1800A includes at least one of further units which receive the decoded information and handle accordingly, namely a transmission unit 1820, reception unit 1830, and configuration unit 1840. For instance, if the DCI received relates to uplink transmission and includes an uplink grant and/or configuration information, the transmission unit 1820 generates the data to be transmitted in accordance with the received grant. This includes taking the granted amount of data, modulation and coding scheme, and mapping the coded data as configured by the DCI onto the physical uplink resources, i.e., transmitting the data. This includes, if the granted carrier is an LBT carrier, performing the LBT procedure beforehand as described above. The reception unit 1820 may also receive feedback from the UE and notify the search space monitoring unit 1810 accordingly. In particular, the configuration of the search space may be received.

On the other hand, if the DCI received relates to downlink transmission and includes a downlink grant and/or configuration information, the reception unit 1830 received the data in the granted resources and decodes them according to the received configuration (including coding and modulation scheme and further features configure). The reception includes demapping the data from the granted resources according to the configuration specified in the DCI.

Still further, if the DCI received does not include any grant for transmission or reception, the configuration unit 1840 configures the UE according to the received information from the DCI for the purpose of future transmissions or receptions. In particular, such configuration may be a power control information upon reception of which the configuration unit 1840 configures the transmission power on the respective carrier indicated by the DCI (implicitly or explicitly). As described above, other configurations may be performed without at the same time signaling grant, i.e., scheduling data, such as configurations for TDD mode.

Moreover, an apparatus 1800B is provided for transmitting or receiving data in subframes of a wireless communication system, the wireless communication system supporting aggregation of a plurality of component carriers and an additional carrier accessible by a listen before talk approach. Such apparatus 1800B may be implemented in a base station and/or a radio controller. In terms of LTE, it may be an eNB. In general, such apparatus is advantageously implemented in a device which performs scheduling and/or configuration of the devices 1800A exemplified above.

The apparatus 1800A includes a scheduling unit 1850 being a part of a transceiver unit for transmitting in a search space on a cross-scheduling component carrier downlink control information having a carrier identification field indicating the cross-scheduling component carrier as well as downlink control information with the carrier identification field indicating the additional carrier, wherein the search space is specified by a subset of resources, associated with carrier identification of the cross-scheduling component carrier but is not associated with carrier identification of the additional carrier, and for receiving or transmitting data on the carriers in accordance with the transmitted downlink control information.

The scheduling unit 1850 schedules the transmission of the DCI, i.e., selects resources in the search space, on which the DCI is transmitted. It may further schedule the UEs and thus generate the DCI with the corresponding configuration for the respective UEs. The transmission unit 1860 then transmits the scheduled DCI with the information for scheduling and/or configuring the UE for transmission or reception of data. The reception unit 1870 on the other hand may serve for receiving the scheduled data and/or feedback based on which the scheduling is performed (such as acknowledgements or indications of channel quality).

The present disclosure provides a search space configuration and DCI configuration particularly advantageous for systems with shared bandwidth co-existing with dedicated system bandwidth. In particular, the search space monitoring unit may be configured to perform monitoring for the downlink control information for the cross-scheduling component carrier and the downlink control information for the additional carrier having the same predetermined sizes.

In addition, the size of DCIs transmitted on the component carrier for configuring uplink of the component carrier (A1, A3) may be the same as the size of DCIs transmitted on the component carrier for configuring uplink of the additional carrier (U1, U2). This provides additional benefits of reducing the number of blind decoding attempts.

Alternatively or in addition, the size of DCIs transmitted on the component carrier for configuring uplink of the additional carrier (U1, U2) may be the same as the size of DCIs transmitted on the component carrier for configuring downlink of the additional carrier (D1, D2).

Alternatively or in addition, the size of the downlink control information carrying an uplink grant for the additional carrier (U1) may be padded to the size of a downlink control information carrying a downlink grant for the cross-scheduling component carrier and/or other carriers (A2, B2).

Alternatively or in addition, the size of the downlink control information format carrying an uplink grant for the additional carrier (U1) may be padded to the size of a downlink control information format carrying a uplink grant for the cross-scheduling component carrier and/or other carriers (A3, B3) which is larger than the downlink control information format carrying an uplink grant for the additional carrier (U1).

In particular, the downlink control information, DCI, carrying the uplink grant for the additional carrier (U1) may correspond to DCI Format 0 of 3GPP LTE-A and its size is padded to match the size of DCI Format 2D which is larger than DCI Format 0 and carrying downlink grants for the cross-scheduling carrier and/or other carriers (A2, B2).

Alternatively or in addition, the downlink control information, DCI, carrying the uplink grant for the additional carrier on the cross-scheduling component carrier (U1) may have the same size as the DCI carrying uplink grant for the cross-scheduling component carrier on which the DCI is received (A1), and the size of a resource block allocation field in the DCI carrying uplink grant for the component carrier on which the DCI is received (A1) is larger than the size of the resource block allocation field in the DCI carrying the uplink grant for the additional carrier on the component carrier (U1).

Advantageously, the downlink control information transmitted in the search space of the cross-scheduling cell for the additional carrier only includes grants for uplink but not for downlink.

Moreover, monitoring a search space may be performed on the additional carrier for detecting downlink control information having no carrier identification field and relating to downlink data reception on the additional carrier, and data are then received on the additional carrier in accordance with the downlink control information detected.

Advantageously, the downlink control information includes at least one of: a carrier indication field for identifying the carrier for which the grant is designated when the DCI is carried on the cross-scheduling component carrier and relates to uplink, an uplink/downlink indicator specifying whether the DCI relates to uplink or downlink if DCIs relating to uplink and downlink have the same sizes.

Hardware and Software Implementation of the Present Disclosure

Other exemplary embodiments relate to the implementation of the above described various embodiments using hardware, software, or software in cooperation with hardware. In this connection a user terminal (mobile terminal) and an eNodeB (base station) are provided. The user terminal and base station is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The present disclosure relates to transmission and reception of data in a wireless communication system, the wireless communication system supporting aggregation of a plurality of component carriers and an additional carrier accessible by a listen before talk approach. In particular, monitoring is performed of a search space on a cross-scheduling component carrier for detecting downlink control information having a carrier identification field indicating the cross-scheduling component carrier as well as for detecting downlink control information with the carrier identification field indicating the additional carrier, wherein the search space is specified by a subset of resources, associated with carrier identification of the cross-scheduling component carrier but is not associated with carrier identification of the additional carrier. Then data are transmitted or received on the carriers in accordance with the received downlink control information.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A terminal apparatus in a wireless communication system capable of aggregating a plurality of carriers including a component carrier and an additional carrier, the terminal apparatus comprising:
   circuitry, which, in operation,
      monitors a first search space on the component carrier and a second search space on the additional carrier, wherein the first search space includes a subset of resources not associated with the additional carrier,
      detects one or a plurality of downlink control information (DCI) on the first and/or second search space, and
      sets a transmission configuration for the terminal apparatus according to configuration information in the detected DCI,
   a transmitter, which, in operation, transmits uplink transmission on the component carrier and/or the additional carrier responsive to the DCI detected on the first search space containing information related to the uplink transmission, and
   a receiver, which, in operation,
      responsive to the DCI detected on the first search space containing information related to the downlink transmission, receives downlink transmission on the component carrier, and
      responsive to the DCI detected on the second search space containing information related to the downlink transmission, receives downlink transmission on the additional carrier, wherein the DCI detected on the second search space does not include a carrier identification field,
   wherein a size of the DCI carrying an uplink grant for the additional carrier is padded to a size of the DCI carrying a downlink grant for the component carrier, and
   wherein a configuration based on the DCI detected in the first search space on the component carrier for the additional carrier is only applied for a transmission in case of a grant for uplink but is discarded in case of a grant for downlink.

2. The terminal apparatus according to claim 1, wherein the DCI detected on the first search space includes the carrier identification field indicating the component carrier.

3. The terminal apparatus according to claim 1, wherein the DCI detected on the first search space includes the carrier identification field indicating the additional carrier.

4. The terminal apparatus according to claim 1, wherein the information related to the uplink transmission includes at least one of the uplink grant and uplink configuration information.

5. The terminal apparatus according to claim 1, wherein the information related to the downlink transmission includes at least one of the downlink grant and downlink configuration information.

6. The terminal apparatus according to claim 1, wherein the receiver, in operation, receives the configuration information related to the first search space on the component carrier.

7. The terminal apparatus according to claim 1, wherein the size of the DCI configuring uplink transmission for the component carrier is the same as the size of the DCI configuring uplink transmission for the additional carrier.

8. A communication method implemented by a terminal apparatus in a wireless communication system capable of aggregating a plurality of carriers including a component carrier and an additional carrier, the communication method comprising:

monitoring a first search space on the component carrier and a second search space on the additional carrier, wherein the first search space includes a subset of resources not associated with the additional carrier, detecting one or a plurality of downlink control information (DCI) on the first and/or second search space, setting a transmission configuration for the terminal apparatus according to configuration information in the detected DCI, transmitting uplink transmission on the component carrier and/or the additional carrier in response to the DCI detected on the first search space containing information related to the uplink transmission, in response to the DCI detected on the first search space containing information related to the downlink transmission, receiving downlink transmission on the component carrier; and in response to the DCI detected on the second search space containing information related to the downlink transmission, receiving downlink transmission on the additional carrier, wherein the DCI detected on the second search space does not include a carrier identification field, wherein a size of the DCI carrying an uplink grant for the additional carrier is padded to a size of the DCI carrying a downlink grant for the component carrier, and wherein a configuration based on the DCI detected in the first search space on the component carrier for the additional carrier is only applied for a transmission in case of a grant for uplink but is discarded in case of a grant for downlink.

9. The communication method according to claim 8, wherein the DCI detected on the first search space includes the carrier identification field indicating the component carrier.

10. The communication method according to claim 8, wherein the DCI detected on the first search space includes the carrier identification field indicating the additional carrier.

11. The communication method according to claim 8, wherein the information related to the uplink transmission includes at least one of the uplink grant and uplink configuration information.

12. The communication method according to claim 8, wherein the information related to the downlink transmission includes at least one of the downlink grant and downlink configuration information.

13. The communication method according to claim 8, wherein the configuration information in the detected DCI is related to the first search space on the component carrier.

14. The communication method according to claim 8, wherein the size of the DCI configuring uplink transmission for the component carrier is the same as the size of the DCI configuring uplink transmission for the additional carrier.

* * * * *